United States Patent
Onozaki et al.

(10) Patent No.: US 9,960,450 B2
(45) Date of Patent: May 1, 2018

(54) NON-AQUEOUS ELECTROLYTE SOLUTION FOR SECONDARY BATTERIES, AND LITHIUM ION SECONDARY BATTERY

(71) Applicant: Asahi Glass Company, Limited, Chiyoda-ku (JP)

(72) Inventors: Yu Onozaki, Chiyoda-ku (JP); Eisuke Murotani, Chiyoda-ku (JP); Toyokazu Enta, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days. days.

(21) Appl. No.: 15/008,638

(22) Filed: Jan. 28, 2016

(65) Prior Publication Data

US 2016/0141720 A1    May 19, 2016

Related U.S. Application Data

(63) Continuation of application No. PCT/JP2014/075139, filed on Sep. 22, 2014.

(30) Foreign Application Priority Data

Sep. 24, 2013  (JP) ................................ 2013-197592

(51) Int. Cl.
| | |
|---|---|
| H01M 10/0568 | (2010.01) |
| H01M 10/0569 | (2010.01) |
| H01M 10/0525 | (2010.01) |
| H01M 10/0567 | (2010.01) |

(52) U.S. Cl.
CPC ... *H01M 10/0569* (2013.01); *H01M 10/0525* (2013.01); *H01M 10/0567* (2013.01); *H01M 10/0568* (2013.01); *H01M 2220/20* (2013.01); *H01M 2220/30* (2013.01); *H01M 2300/0028* (2013.01); *H01M 2300/0037* (2013.01); *Y02T 10/7011* (2013.01)

(58) Field of Classification Search
CPC ........ H01M 10/0525; H01M 10/0567; H01M 10/0569; H01M 2220/20; H01M 2220/30; H01M 2300/0037; H01M 10/0568
See application file for complete search history.

(56) References Cited

U.S. PATENT DOCUMENTS

| | | | |
|---|---|---|---|
| 9,236,636 B2 | 1/2016 | Onozaki et al. | |
| 2004/0038133 A1* | 2/2004 | Yamaguchi | ....... H01M 10/0569 429/326 |
| 2005/0014072 A1 | 1/2005 | Yamaguchi et al. | |
| 2009/0130567 A1* | 5/2009 | Segawa | .................. H01G 9/022 429/335 |
| 2010/0099031 A1 | 4/2010 | Kato et al. | |
| 2010/0119956 A1 | 5/2010 | Tokuda et al. | |
| 2010/0323240 A1* | 12/2010 | Tsujioka | ................ C01B 25/455 429/199 |
| 2011/0008681 A1* | 1/2011 | Koh | ....................... H01G 9/038 429/331 |
| 2012/0219866 A1 | 8/2012 | Onuki et al. | |
| 2012/0264010 A1 | 10/2012 | Kato et al. | |
| 2013/0011728 A1 | 1/2013 | Tokuda et al. | |
| 2013/0216918 A1 | 8/2013 | Tokuda et al. | |
| 2013/0244122 A1 | 9/2013 | Onuki et al. | |
| 2013/0337343 A1 | 12/2013 | Tokuda et al. | |

FOREIGN PATENT DOCUMENTS

| | | |
|---|---|---|
| JP | 2005-38722 | 2/2005 |
| JP | 2008-192504 | 8/2008 |
| JP | 2008-269982 | 11/2008 |
| JP | 2010-086914 | * 4/2010 |
| JP | 2011-71098 | 4/2011 |
| JP | 2012-64472 | 3/2012 |
| WO | WO 2008/126800 A1 | 10/2008 |
| WO | WO 2008/133207 A1 | 11/2008 |
| WO | WO 2013/146359 A1 | 10/2013 |

OTHER PUBLICATIONS

Machine translation of JP2010-086914, published on Apr. 15, 2010.*
Product Data Sheet HFE-458, date unknown.*
English Translation of International Search Report dated Nov. 18, 2014 in PCT/JP2014/075139, filed Sep. 22, 2014.

* cited by examiner

*Primary Examiner* — Anca Eoff
(74) *Attorney, Agent, or Firm* — Oblon, McClelland, Maier & Neustadt, L.L.P.

(57) ABSTRACT

To provide a flame retardant non-aqueous electrolyte solution for secondary batteries, with which a lithium ion secondary battery which is less likely to undergo thermal runaway and which is excellent in the high temperature storage properties can be obtained; and a lithium ion secondary battery using the non-aqueous electrolyte solution for secondary batteries.

A non-aqueous electrolyte solution for secondary batteries, comprising an electrolyte salt and a liquid composition, which contains either one or both of monofluorophosphate anions and difluorophosphate anions derived from at least part of the electrolyte salt,
wherein at least a lithium salt is contained as one type of the electrolyte salt, and
the liquid composition comprises at least one fluorine-containing solvent ($\alpha$) selected from the group consisting of a fluorine-containing ether compound, a fluorine-containing chain carboxylic acid ester compound and a fluorine-containing chain carbonate compound, and a cyclic carboxylic acid ester compound. A lithium ion secondary battery using the non-aqueous electrolyte solution for secondary batteries.

20 Claims, No Drawings

NON-AQUEOUS ELECTROLYTE SOLUTION FOR SECONDARY BATTERIES, AND LITHIUM ION SECONDARY BATTERY

TECHNICAL FIELD

The present invention relates to a non-aqueous electrolyte solution for secondary batteries, and a lithium ion secondary battery.

BACKGROUND ART

For portable electronic devices such as mobile phones and notebook computers, a lithium ion secondary battery comprising a positive electrode, a negative electrode and a non-aqueous electrolyte solution for secondary batteries has been widely used. As a solvent of a non-aqueous electrolyte solution for lithium ion secondary batteries, a carbonate type solvent (such as ethylene carbonate or dimethyl carbonate) has been widely used in that it dissolves a lithium salt excellently to provide a high lithium ion conductivity, and it has a wide potential window. However, since a carbonate type solvent is flammable, there is a risk of ignition e.g. by heat generation of the battery.

Thus, as a non-aqueous electrolyte solution excellent in flame retardance, a non-aqueous electrolyte solution using a fluorine-containing solvent has been proposed.

For example, as a flame retardant non-aqueous electrolyte solution having favorable battery properties (the cycle properties and the discharge capacity), a non-aqueous electrolyte solution comprising a fluorine-containing solvent, a non-fluorinated cyclic carbonate, a non-fluorinated cyclic ester and a lithium salt has been known (Patent Document 1).

However, according to studies by the present inventors, if a lithium ion secondary battery using the non-aqueous electrolyte solution in Patent Document 1 is stored at high temperature, its discharge capacity is likely to decrease, it is likely to generate a gas, and its high temperature storage properties are insufficient.

As a method for increasing high temperature storage properties of a non-aqueous electrolyte solution using a carbonate type solvent, it has been proposed to incorporate at least one of a monofluorophosphate and a difluorophosphate (Patent Document 2).

However, incorporation of a monofluorophosphate or a difluorophosphate into a non-aqueous electrolyte solution as in Patent Document 1 has not been studied, and a non-aqueous electrolyte solution having both flame retardance and high temperature storage properties has not been obtained yet.

In general, during use of a secondary battery, the battery temperature rises due to e.g. Joule heat or heating from outside, and if the battery temperature reaches a high temperature at a level exceeding 150° C., thermal runaway may occur to cause breakage of the battery. Such thermal runaway is known to be caused by heat generation which occurs when components in the electrolyte solution are reacted with electrodes and decomposed. Therefore, it is important for a lithium ion secondary battery that the non-aqueous electrolyte solution has a low reactivity with electrodes and is less likely to cause heat generation.

PRIOR ART DOCUMENTS

Patent Documents

Patent Document 1: JP-A-2008-192504
Patent Document 2: JP-A-2008-269982

DISCLOSURE OF INVENTION

Technical Problem

The present invention provides a flame retardant non-aqueous electrolyte solution for secondary batteries with which a lithium ion secondary battery which is less likely to undergo thermal runaway and which is excellent in the high temperature storage properties can be obtained. The present invention further provides a lithium ion secondary battery which is less likely to undergo thermal runaway and which is excellent in the high temperature storage properties can be used safely.

Solution to Problem

The present invention is to achieve the above objects and provides the following.

[1] A non-aqueous electrolyte solution for secondary batteries, comprising an electrolyte salt and a liquid composition, which contains either one or both of monofluorophosphate anions and difluorophosphate anions derived from at least part of the electrolyte salt, wherein at least a lithium salt is contained as one type of the electrolyte salt, and the liquid composition comprises at least one fluorine-containing solvent ($\alpha$) selected from the group consisting of a fluorine-containing ether compound, a fluorine-containing chain carboxylic acid ester compound and a fluorine-containing chain carbonate compound, and a cyclic carboxylic acid ester compound.

[2] The non-aqueous electrolyte solution for secondary batteries according to the above [1], wherein the ratio of the sum of the mass of the monofluorophosphate anions and the mass of the difluorophosphate anions to the total mass of the non-aqueous electrolyte solution is from 0.001 to 2 mass %.

[3] The non-aqueous electrolyte solution for secondary batteries according to the above [1] or [2], wherein the liquid composition further contains at least one compound ($\beta$) selected from the group consisting of a saturated cyclic carbonate compound, a saturated chain carbonate compound having no fluorine atom, a saturated cyclic sulfone compound (excluding a lithium salt) and a phosphoric acid ester compound.

[4] The non-aqueous electrolyte solution for secondary batteries according to the above [3], wherein the ratio of the mass of the saturated chain carbonate compound having no fluorine atom to the total mass of the non-aqueous electrolyte solution is at most 30 mass %.

[5] The non-aqueous electrolyte solution for secondary batteries according to the above [3] or [4], wherein the ratio of the sum of the mass of the saturated cyclic carbonate compound and the mass of the saturated chain carbonate compound having no fluorine atom to the total mass of the non-aqueous electrolyte solution is at most 30 mass %.

[6] The non-aqueous electrolyte solution for secondary batteries according to any one of the above [3] to [5], wherein $(N_A+N_B)/N_{Li}$, i.e. the ratio of the sum of the total number of moles ($N_A$) of the cyclic carboxylic acid ester compound and the total number of moles ($N_B$) of the compound ($\beta$) to the total number of moles ($N_{Li}$) of lithium atoms derived from the lithium salt, is from 3.0 to 7.0.

[7] The non-aqueous electrolyte solution for secondary batteries according to any one of the above [1] to [6], wherein the fluorine-containing solvent (α) contains the fluorine-containing ether compound.

[8] The non-aqueous electrolyte solution for secondary batteries according to the above [7], wherein the fluorine-containing ether compound is at least one member selected from the group consisting of compounds represented by the following formula (1):

$$R^1-O-R^2 \quad (1)$$

(wherein each of $R^1$ and $R^2$ which are independent of each other, is a $C_{1-10}$ alkyl group, a $C_{3-10}$ cycloalkyl group, a $C_{1-10}$ fluorinated alkyl group, a $C_{3-10}$ fluorinated cycloalkyl group, a $C_{2-10}$ alkyl group having at least one etheric oxygen atom, or a $C_{2-10}$ fluorinated alkyl group having at least one etheric oxygen atom, provided that one or each of $R^1$ and $R^2$ is a $C_{1-10}$ fluorinated alkyl group, a $C_{3-10}$ fluorinated cycloalkyl group or a $C_{2-10}$ fluorinated alkyl group having at least one etheric oxygen atom).

[9] The non-aqueous electrolyte solution for secondary batteries according to the above [8], wherein the compound represented by the formula (1) contains at least one member selected from the group consisting of $CF_3CH_2OCF_2CHF_2$, $CF_3CH_2OCF_2CHFCF_3$, $CHF_2CF_2CH_2OCF_2CHF_2$, $CH_3CH_2CH_2OCF_2CHF_2$, $CH_3CH_2OCF_2CHF_2$ and $CHF_2CF_2CH_2OCF_2CHFCF_3$.

[10] The non-aqueous electrolyte solution for secondary batteries according to any one of the above [1] to [9], wherein the lithium salt contains $LiPF_6$.

[11] The non-aqueous electrolyte solution for secondary batteries according to any one of the above [1] to [10], wherein the fluorine-containing chain carboxylic acid ester compound is at least one member selected from the group consisting of compounds represented by the following formula (2):

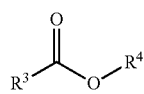

(2)

(wherein each of $R^3$ and $R^4$ which are independent of each other, is a $C_{1-3}$ alkyl group or a $C_{1-3}$ fluorinated alkyl group, provided that one or each of $R^3$ and $R^4$ is a fluorinated alkyl group).

[12] The non-aqueous electrolyte solution for secondary batteries according to any one of the above [1] to [11], wherein the cyclic carboxylic acid ester compound is at least one member selected from the group consisting of compounds represented by the following formula (4):

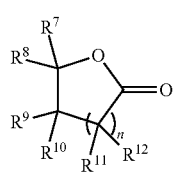

(4)

(wherein each of $R^7$ to $R^{12}$ which are independent of one another, is a hydrogen atom, a fluorine atom, a chlorine atom, a $C_{1-2}$ alkyl group, a $C_{1-2}$ fluorinated alkyl group or a $C_{2-3}$ alkyl group having an etheric oxygen atom, and n is an integer of from 1 to 3).

[13] The non-aqueous electrolyte solution for secondary batteries according to the above [12], wherein the compound represented by the formula (4) is at least one member selected from the group consisting of γ-butyrolactone, γ-valerolactone and ε-caprolactone.

[14] The non-aqueous electrolyte solution for secondary batteries according to any one of the above [1] to [13], wherein the ratio of the mass of the fluorine-containing solvent (α) to the total mass of the non-aqueous electrolyte solution is from 30 to 80 mass %.

[15] The non-aqueous electrolyte solution for secondary batteries according to any one of the above [1] to [14], wherein $N_A/N_{Li}$, i.e. the ratio of the total number of moles ($N_A$) of the cyclic carboxylic acid ester compound to the total number of moles ($N_{Li}$) of lithium atoms derived from the lithium salt, is from 1.5 to 7.0.

[16] The non-aqueous electrolyte solution for secondary batteries according to any one of the above [1] to [15], which has a lithium salt content of from 0.7 to 1.5 mol/L.

[17] The non-aqueous electrolyte solution for secondary batteries according to any one of the above [1] to [16], wherein the ratio of the mass of the cyclic carboxylic acid ester compound to the total mass of the non-aqueous electrolyte solution is from 4 to 50 mass %.

[18] A lithium ion secondary battery comprising a positive electrode containing, as an active material, a material capable of absorbing and desorbing lithium ions, a negative electrode containing, as an active material, at least one member selected from the group consisting of metal lithium, a lithium alloy and a carbon material capable of absorbing and desorbing lithium ions, and the non-aqueous electrolyte solution for secondary batteries as defined in any one of the above [1] to [17].

Advantageous Effects of Invention

According to the non-aqueous electrolyte solution for secondary batteries of the present invention, a lithium ion secondary battery which is less likely to undergo thermal runaway and which is excellent in the high temperature storage properties can be obtained, and further, it is flame retardant.

Further, the lithium ion secondary battery of the present invention is less likely to undergo thermal runaway, is excellent in the high temperature storage properties and is used safely.

DESCRIPTION OF EMBODIMENTS

In this specification, a compound represented by the formula (1) will be referred to as a compound (1). The same applies to compounds represented by other formulae.

The following definitions of terms are applicable throughout description and claims.

"The non-aqueous electrolyte solution" means an electrolyte solution containing substantially no water, and even if it contains water, the amount of water is within such a range that performance degradation of a secondary battery using such a non-aqueous electrolyte solution is thereby not observed. The amount of water contained in such a non-aqueous electrolyte solution is preferably at most 500 mass ppm, more preferably at most 100 mass ppm, particularly preferably at most 50 mass ppm, based on the total mass of the non-aqueous electrolyte solution. The lower limit of the amount of water is 0 mass ppm.

Compounds other than the lithium salt, the fluorine-containing solvent (α), the cyclic carboxylic acid ester compound and the compound (β) (that is, another solvent, additives, etc.) are defined as "other components" and are distinguished from the lithium salt and the liquid composition.

"The fluorine-containing ether compound" means a chain or cyclic compound having an ether bond and having a fluorine atom.

"The fluorine-containing chain carboxylic acid ester compound" means a chain compound having an ester bond in its chain structure, having no cyclic structure containing an ester bond, and having a fluorine atom.

"The fluorine-containing chain carbonate compound" means a chain compound having a carbonate bond represented by —O—C(=O)—O— in its chain structure, having no cyclic structure containing a carbonate bond, and having a fluorine atom.

"A fluorine-containing alkane compound" means a compound having at least one hydrogen atom in an alkane substituted with a fluorine atom and having remaining hydrogen atoms.

"The cyclic carboxylic acid ester compound" means a cyclic compound having an ester bond as a part of the cyclic skeleton.

"The saturated cyclic carbonate compound" means a cyclic compound having a cyclic skeleton composed of carbon atoms and oxygen atoms, having a carbonate bond represented by —O—C(=O)—O— as a part of the cyclic skeleton, and having no carbon-carbon unsaturated bond.

"The saturated chain carbonate compound having no fluorine atom" means a chain compound having a carbonate bond represented by —O—C(=O)—O— in its chain structure, having no cyclic structure having a carbonate bond, and having no fluorine atom nor carbon-carbon unsaturated bond.

"Fluorinated" and "fluorine-containing" mean that part of or all the hydrogen atoms bonded to carbon atoms are substituted with fluorine atoms.

"The fluorinated alkyl group" means a group having part of or all the hydrogen atoms in an alkyl group substituted with fluorine atoms. In a group having part of hydrogen atoms fluorinated, hydrogen atoms and fluorine atoms are present.

"The carbon-carbon unsaturated bond" means a carbon-carbon double bond or a carbon-carbon triple bond.

<Non-Electrolyte Solution for Secondary Batteries>

The non-aqueous electrolyte solution for secondary batteries of the present invention (hereinafter sometimes referred to simply as a non-aqueous electrolyte solution) comprises an electrolyte salt and a liquid composition and as the case requires, contains another component.

The lower limit value for the ion conductivity at 25° C. of the non-aqueous electrolyte solution is preferably 0.4 S/m. A secondary battery using a non-aqueous electrolyte solution, of which the ion conductivity at 25° C. is less than 0.4 S/m, is inferior in output properties and thus is poor in practical applicability. When the ion conductivity at 25° C. of the non-aqueous electrolyte solution is at least 0.40 S/m, the secondary battery will be excellent in output properties.

[Electrolyte Salt]

At least a lithium salt is contained as one type of the electrolyte salt.

As the electrolyte salt, only a lithium salt is used, or a lithium salt and an electrolyte salt other than the lithium salt may be used in combination. As the electrolyte salt other than the lithium salt, the after-mentioned monofluorophosphate and difluorophosphate may be mentioned.

(Lithium Salt)

The lithium salt is dissociated in the non-aqueous electrolyte solution to supply lithium ions. The lithium salt may, for example, be lithium monofluorophosphate ($Li_2PO_3F$), lithium difluorophosphate ($LiPO_2F_2$), $LiPF_6$, the following compound (A) (wherein k is an integer of from 1 to 5), $FSO_2N(Li)SO_2F$, $CF_3SO_2N(Li)SO_2CF_3$, $CF_3CF_2SO_2N(Li)SO_2CF_2CF_3$, $CF_3CFHSO_2N(Li)SO_2CFHCF_3$, $LiClO_4$, the following compounds (B) to (E), or $LiBF_4$. As the lithium salt, one type may be used alone, or two or more types may be used in combination.

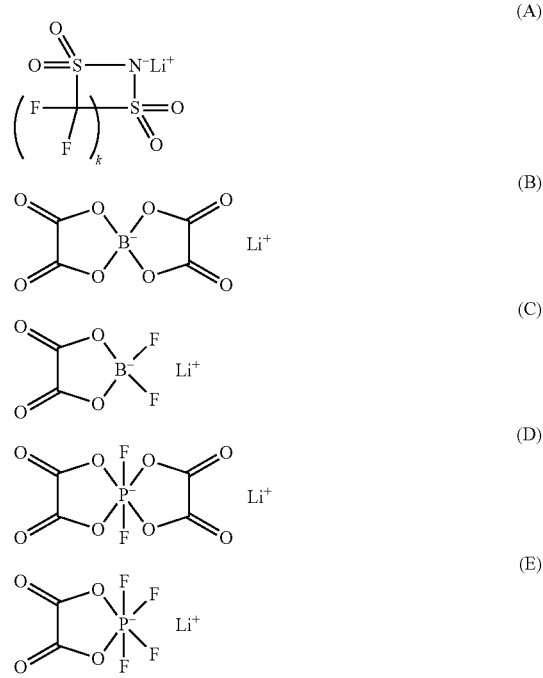

The lithium salt contained in the non-aqueous electrolyte solution preferably contains $LiPF_6$.

$LiPF_6$ develops a high ion conductivity when dissolved in a solvent with a high dissolving power, but is less likely to be dissolved in a fluorine-containing solvent as compared with another lithium salt such as $CF_3CF_2SO_2N(Li)SO_2CF_2CF_3$. However, the solubility of $LiPF_6$ in a fluorine-containing solvent will be improved when $LiPF_6$ is used in combination with a cyclic carboxylic acid ester compound. By $LiPF_6$ being uniformly dissolved in a fluorine-containing solvent, a non-aqueous electrolyte solution having a practically sufficient ion conductivity tends to be obtained. Further, $LiPF_6$ tends to be thermally decomposed and to lower the thermal stability of the obtainable battery, however, by the non-aqueous electrolyte solution of the present invention containing the cyclic carboxylic acid ester compound, even a lithium ion secondary battery using $LiPF_6$ is less likely to undergo thermal runaway.

As the compound (A), the following compounds (A-1) to (A-4) may, for example, be mentioned. The compound (A) preferably contains the compound (A-2) wherein k is 2, more preferably consists solely of the compound (A-2) wherein k is 2, whereby a non-aqueous electrolyte solution with a high ion conductivity tends to be obtained.

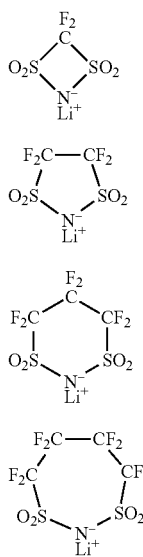

Further, the non-aqueous electrolyte solution of the present invention contains either one or both of monofluorophosphate anions and difluorophosphate anions derived from at least part of the electrolyte salt. That is, the non-aqueous electrolyte solution of the present invention contains either one or both of anions caused by dissociation of a monofluorophosphate and anions formed by dissociation of a difluorophosphate, whereby a lithium ion secondary battery of which the discharge capacity is less likely to decrease and which is less likely to generate a gas even when stored at high temperature, and which is excellent in the high temperature storage properties, can be obtained.

The monofluorophosphate is preferably $Li_2PO_3F$ in view of influences of cations contained over battery properties.

The difluorophosphate is preferably $LiPO_2F_2$ in view of influences of cations contained over battery properties.

In a case where $Li_2PO_3F$ is used as the lithium salt, by dissociation in the non-aqueous electrolyte solution, both lithium ions and monofluorophosphate anions are supplied. Likewise, in a case where $LiPO_2F_2$ is used as the lithium salt, by dissociation in the non-aqueous electrolyte solution, both lithium ions and difluorophosphate anions are supplied. In a case where at least one of $Li_2PO_3F$ and $LiPO_2F_2$ is used, the non-aqueous electrolyte solution may or may not contain another lithium salt.

In the present invention, in a case where either one or both of $Li_2PO_3F$ and $LiPO_2F_2$ is used, $LiPF_6$ is preferably further used in combination.

The monofluorophosphate to provide monofluorophosphate anions may be a monofluorophosphate other than $Li_2PO_3F$. Likewise, the difluorophosphate to provide difluorophosphate anions may be a difluorophosphate other than $LiPO_2F_2$.

In a case where the monofluorophosphate or the difluorophosphate may be a salt other than $Li_2PO_3F$ or $LiPO_2F_2$, the non-aqueous electrolyte solution of the present invention contains any lithium salt as the electrolyte salt.

(Another Monofluorophosphate)

Another monofluorophosphate may, for example, be $Na_2PO_3F$, $MgPO_3F$, $CaPO_3F$, $Al_2(PO_3F)_3$, $Ga_2(PO_3F)_3$ or $K_2PO_3F$. Among them, preferred is $Na_2PO_3F$ or $K_2PO_3F$, in view of influences of cations contained over battery properties.

(Another Difluorophosphate)

Another difluorophosphate may, for example, be $NaPO_2F_2$, $Mg(PO_2F_2)_2$, $Ca(PO_2F_2)_2$, $Al(PO_2F_2)_3$, $Ga(PO_2F_2)_3$ or $KPO_2F_2$. Among them, preferred is $NaPO_2F_2$ or $KPO_2F_2$ in view of influences of cations contained over battery properties.

The non-aqueous electrolyte solution of the present invention may contain only monofluorophosphate anions, may contain only difluorophosphate anions, or may contain both monofluorophosphate anions and difluorophosphate anions. In a case where it contains both monofluorophosphate anions and difluorophosphate anions, their ratio may properly be determined.

In a case where the non-aqueous electrolyte solution of the present invention contains monofluorophosphate anions, as the monofluorophosphate anions, one type may be contained, or two or more types may be contained. In a case where the non-aqueous electrolyte solution of the present invention contains difluorophosphate anions, as the difluorophosphate anions, one type may be contained, or two or more types may be contained.

[Liquid Composition]

The liquid composition comprises the fluorine-containing solvent ($\alpha$) and the cyclic carboxylic acid ester compound and as the case requires, may contain the compound ($\beta$). That is, the liquid composition in the present invention is either one consisting solely of the fluorine-containing solvent ($\alpha$) and the cyclic carboxylic acid ester compound or one consisting of the fluorine-containing solvent ($\alpha$), the cyclic carboxylic acid ester compound and the compound ($\beta$).

(Fluorine-Containing Solvent ($\alpha$))

The fluorine-containing solvent ($\alpha$) contains at least one member selected from the group consisting of a fluorine-containing ether compound, a fluorine-containing chain carboxylic acid ester compound and a fluorine-containing chain carbonate compound and as the case requires, may contain another fluorine-containing solvent (excluding the fluorine-containing cyclic carbonate compound). The fluorine-containing ether compound, the fluorine-containing chain carboxylic acid ester compound and the fluorine-containing chain carbonate compound have similar properties regarding chemical stability by introduction of fluorine atoms, compatibility with other compounds, etc., and can be regarded as equivalent compounds.

The fluorine-containing solvent ($\alpha$) is a solvent having a fluorine atom in its molecule and is excellent in the flame retardance. As the fluorine-containing solvent ($\alpha$), one type may be used alone, or two or more types may be used in combination. When two or more types of the fluorine-containing solvent ($\alpha$) are to be used, their ratio may optionally be set.

Fluorine-Containing Ether Compound:

The fluorine-containing solvent ($\alpha$) preferably contains a fluorine-containing ether compound, whereby high solubility of the lithium salt, flame retardance and ion conductivity of the non-aqueous electrolyte solution will be achieved. The fluorine-containing ether compound is preferably the following compound (1), whereby high solubility of the lithium salt, flame retardance and ion conductivity of the non-aqueous electrolyte solution will be achieved. As the fluorine-containing ether compound, one type may be used alone, or two or more types may be used in combination. In a case where the compound (1) is contained, as the compound (1), one type may be used alone, or two or more types may be used in combination. When two or more types of the fluorine-containing ether compound are to be used, their ratio may optionally be set.

wherein each of $R^1$ and $R^2$ which are independent of each other, is a $C_{1-10}$ alkyl group, a $C_{3-10}$ cycloalkyl group, a $C_{1-10}$ fluorinated alkyl group, a $C_{3-10}$ fluorinated cycloalkyl group, a $C_{2-10}$ alkyl group having at least one etheric oxygen atom, or a $C_{2-10}$ fluorinated alkyl group having at least one etheric oxygen atom, provided that one or each of $R^1$ and $R^2$ is a $C_{1-10}$ fluorinated alkyl group, a $C_{3-10}$ fluorinated cycloalkyl group or a $C_{2-10}$ fluorinated alkyl group having at least one etheric oxygen atom.

In the compound (1), each of the alkyl group and the alkyl group having an etheric oxygen atom may, for example, be a group having a straight chain structure, a branched structure or a partially cyclic structure (e.g. a cycloalkylalkyl group).

One or each of $R^1$ and $R^2$ is a $C_{1-10}$ fluorinated alkyl group, a $C_{3-10}$ fluorinated cycloalkyl group or a $C_{2-10}$ fluorinated alkyl group having at least one etheric oxygen atom. When one or each of $R^1$ and $R^2$ is such a group, the solubility of the lithium salt in the non-aqueous electrolyte solution and the flame retardance will further improve. $R^1$ and $R^2$ may be the same or different.

The compound (1) is preferably a compound (1-A) wherein each of $R^1$ and $R^2$ is a $C_{1-10}$ fluorinated alkyl group, a compound (1-B) wherein $R^1$ is a $C_{2-10}$ fluorinated alkyl group having at least one etheric oxygen atom and $R^2$ is a $C_{1-10}$ fluorinated alkyl group, or a compound (1-C) wherein $R^1$ is a $C_{1-10}$ fluorinated alkyl group and $R^2$ is a $C_{1-10}$ alkyl group, whereby an excellent solubility of the lithium salt in the liquid composition will be achieved, more preferably the compound (1-A) or the compound (1-C), particularly preferably the compound (1-A).

The total number of carbon atoms in the compound (1) is preferably from 4 to 10, more preferably from 4 to 8, since if it is too small, the boiling point will be too low, and if it is too large, the viscosity will the too high.

The molecular weight of the compound (1) is preferably from 150 to 800, more preferably from 150 to 500, particularly preferably from 200 to 500, since if it is too low, the boiling point will be too low, and if it is too high, the viscosity will be too high.

In a case where the compound (1) has an etheric oxygen atom, the number of etheric oxygen atoms in the compound (1) is preferably from 1 to 4, more preferably 1 or 2, further preferably 1. The number of etheric oxygen atoms in the compound (1) is influential over flammability.

The fluorine content in the compound (1) is preferably at least 50 mass %, more preferably at least 60 mass %. When the fluorine content in the compound (1) is high, the flame retardance is excellent. The fluorine content is meant for the proportion of the total mass of fluorine atoms in the molecular weight.

The compound (1) is preferably a compound wherein each of $R^1$ and $R^2$ is a partially fluorinated alkyl group having part of hydrogen atoms in an alkyl group fluorinated, more preferably a compound wherein the terminal of one or each of $R^1$ and $R^2$ is —$CF_2H$, since the solubility of the lithium salt in the liquid composition will be thereby excellent.

Specific examples of the compound (1-A) and the compound (1-B) and specific examples of the fluorine-containing ether compound other than the compounds (1-A) and (1-B), may, for example, be compounds disclosed in WO2009/133899.

The compound (1) is preferably at least one member selected from the group consisting of $CF_3CH_2OCF_2CHF_2$, $CF_3CH_2OCF_2CHFCF_3$, $CHF_2CF_2CH_2OCF_2CHF_2$, $CH_3CH_2CH_2OCF_2CHF_2$, $CH_3CH_2OCF_2CHF_2$ and $CHF_2CF_2CH_2OCF_2CHFCF_3$, particularly preferably at least one member selected from the group consisting of $CF_3CH_2OCF_2CHF_2$, $CHF_2CF_2CH_2OCF_2CHF_2$ and $CHF_2CF_2CH_2OCF_2CHFCF_3$, since the solubility of the lithium salt in the liquid composition will be thereby excellent, the flame retardance will be excellent, the viscosity will be low, and the boiling point will not be too low.

Fluorine-Containing Chain Carboxylic Acid Ester Compound:

The fluorine-containing chain carboxylic acid ester compound preferably contains the following compound (2) in view of the viscosity, the boiling point, etc., more preferably consists solely of the compound (2). As the fluorine-containing chain carboxylic acid ester compound, one type may be used alone, or two or more types may be used in combination. In a case where the compound (2) is used, as the compound (2), one type may be used alone, or two or more types may be used in combination. When two or more types of the fluorine-containing chain carboxylic acid ester compound are to be used, their ratio may optionally be set.

wherein each of $R^3$ and $R^4$ which are independent of each other, is a $C_{1-3}$ alkyl group or a $C_{1-3}$ fluorinated alkyl group, provided that one or each of $R^3$ and $R^4$ is a $C_{1-3}$ fluorinated alkyl group.

In the compound (2), the alkyl group and the fluorinated alkyl group each independently have a straight chain structure or a branched structure.

One or each of $R^3$ and $R^4$ is a $C_{1-3}$ fluorinated alkyl group. When one or each of $R^3$ and $R^4$ is a $C_{1-3}$ fluorinated alkyl group, the compound (2) has improved oxidation resistance and flame retardance. $R^3$ and $R^4$ may be the same or different.

$R^3$ is preferably a methyl group, an ethyl group, a difluoromethyl group, a trifluoromethyl group, a tetrafluoroethyl group or a pentafluoroethyl group, more preferably a difluoromethyl group or a trifluoromethyl group, in view of the viscosity and the boiling point, or availability of the compound.

$R^4$ is preferably a methyl group, an ethyl group, a trifluoromethyl group, a 2-fluoroethyl group, a 2,2-difluoroethyl group or a 2,2,2-trifluoroethyl group, more preferably a methyl group, an ethyl group or a 2,2,2-trifluoroethyl group, further preferably a methyl group or an ethyl group, in view of the viscosity and the boiling point, or availability of the compound.

The total number of carbon atoms in the compound (2) is preferably from 3 to 7, more preferably from 3 to 6, further preferably from 3 to 5, since if it is too small, the boiling point tends to be too low, and if it is too large, the viscosity tends to be too high.

The molecular weight of the compound (2) is preferably from 100 to 300, more preferably from 100 to 250, particularly preferably from 100 to 200, since if it is too low, the boiling point tends to be too low, and if it is too high, the viscosity tends to be too high.

The fluorine content in the compound (2) is preferably at least 25 mass %, more preferably at least 30 mass %, whereby the flame retardance will thereby be improved.

The compound (2) may, for example, be specifically (2,2,2-trifluoroethyl)acetate, methyl difluoroacetate, ethyl difluorotriacetate or ethyl trifluoroacetate. Among them, methyl difluoroacetate or ethyl trifluoroacetate is preferred from the viewpoint of availability and excellent battery performance such as cycle properties.

Fluorine-Containing Chain Carbonate Compound:

The fluorine-containing chain carbonate compound preferably contains the following compound (3), more preferably consists solely of the compound (3) in view of the viscosity, the boiling point, etc. As the fluorine-containing chain carbonate compound, one type may be used alone, or two or more types may be used in combination. When the compound (3) is contained, as the compound (3), one type may be used alone, or two or more types may be used in combination. When two or more types of the fluorine-containing chain carbonate compound are to be used, their ratio may be optionally set.

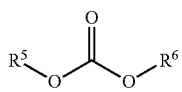

(3)

wherein each of $R^5$ and $R^6$ which are independent of each other, is a $C_{1-3}$ alkyl group or a $C_{1-3}$ fluorinated alkyl group, provided that one or each of $R^5$ and $R^6$ is a $C_{1-3}$ fluorinated alkyl group.

In the compound (3), each of the alkyl group and the fluorinated alkyl group have a straight chain structure or a branched structure.

One or each of $R^5$ and $R^6$ is a $C_{1-3}$ fluorinated alkyl group. When one or each of $R^5$ and $R^6$ is a $C_{1-3}$ fluorinated alkyl group, the solubility of the lithium salt and the flame retardance will be improved. $R^5$ and $R^6$ may be the same or different.

The compound (3) is preferably a compound wherein each of $R^5$ and $R^6$ is a $C_{1-3}$ fluorinated alkyl group, in view of the viscosity and the boiling point, or availability of the compound. As $R^5$ and $R^6$, $CF_3CH_2$— or $CHF_2CF_2CH_2$— is preferred.

The total number of carbon atoms in the compound (3) is preferably from 4 to 7, since if it is too small, the boiling point tends to be too low, and if it is too large, the viscosity tends to be too high.

The molecular weight of the compound (3) is preferably from 180 to 400, more preferably from 200 to 350, particularly preferably from 210 to 300, since if it is too low, the boiling point tends to be too low, and if it is too high, the viscosity tends to be too high.

The fluorine content in the compound (3) is preferably at least 25 mass %, more preferably at least 30 mass %, whereby the flame retardance will thereby be improved.

The compound (3) may, for example, be specifically bis(2,2,2-trifluoroethyl)carbonate or bis(2,2,3,3-tetrafluoropropyl)carbonate. Bis(2,2,2-trifluoroethyl)carbonate is preferred from the viewpoint of the viscosity, availability and battery performance such as output properties.

Another Fluorine-Containing Solvent:

The fluorine-containing solvent (α) may contain as another fluorine-containing solvent a fluorine-containing alkane compound. In a case where the fluorine-containing solvent contains a fluorine-containing alkane compound, the non-aqueous electrolyte solution has its vapor pressure suppressed, and thereby has further improved flame retardance.

The fluorine-containing alkane compound is preferably a $C_{4-12}$ fluorine-containing alkane compound. When a fluorine-containing alkane compound having at least 4 carbon atoms is used, the vapor pressure of the non-aqueous electrolyte solution is low. When a fluorine-containing alkane compound having at most 12 carbon atoms is used, the solubility of the lithium salt is good.

The fluorine content in the fluorine-containing alkane compound is preferably from 50 to 80 mass %. When the fluorine content in the fluorine-containing alkane compound is at least 50 mass %, the flame retardance is excellent. When the fluorine content in the fluorine-containing alkane compound is at most 80 mass %, the solubility of the lithium salt can easily be maintained.

The fluorine-containing alkane compound is preferably a compound having a straight chain structure and may, for example, be n-$C_4F_9CH_2CH_3$, n-$C_6F_{13}CH_2CH_3$, n-$C_6F_{13}H$ or n-$C_8F_{17}H$. As such a fluorine-containing alkane compound, one type may be used alone, or two or more types may be used in combination.

(Cyclic Carboxylic Acid Ester Compound)

The liquid composition contains a cyclic carboxylic acid ester compound. By the cyclic carboxylic acid ester compound, the lithium salt is uniformly dissolved in the fluorine-containing solvent (α). Further, by the cyclic carboxylic acid ester compound, the non-aqueous electrolyte solution is made less reactive with the positive electrode and the negative electrode, and thermal runaway in the secondary battery is made less likely to occur. As the cyclic carboxylic acid ester compound, one type may be used alone, or two or more types may be used in combination.

The cyclic carboxylic acid ester compound is preferably a saturated cyclic carboxylic acid ester compound containing no carbon-carbon unsaturated bond in its molecule, in view of the stability against the oxidation-reduction reaction.

The ring structure in the cyclic carboxylic acid ester compound is preferably a 4- to 10-membered ring, more preferably a 4- to 7-membered ring from the viewpoint of the stability of the structure and the viscosity. From the viewpoint of availability, a 5- or 6-membered ring is further preferred, and a 5-membered ring is particularly preferred. Further, from the viewpoint of availability, the total number of carbon atoms in the cyclic carboxylic acid ester compound is preferably from 4 to 8, more preferably 4 to 6. Further, the cyclic carboxylic acid ester compound is preferably composed solely of carbon atoms, hydrogen atoms and oxygen atoms, and more preferably, the portion other than the ester bond represented by a —C(═O)—O— bond contained in the ring structure, is composed solely of carbon atoms and hydrogen atoms.

The ring structure of the cyclic carboxylic acid ester compound is preferably a ring structure having one ester bond in view of the viscosity.

The cyclic carboxylic acid ester compound may be a compound having at least one of hydrogen atoms in an alkylene group substituted by a substituent. The substituent may, for example, be a fluorine atom, a chlorine atom, an alkyl group, a fluorinated alkyl group or the like. The number of carbon atoms in the alkyl group is preferably 1 or 2, and the number of carbon atoms in the fluorinated alkyl group is preferably 1 or 2.

The cyclic carboxylic acid ester compound preferably contains the following compound (4), more preferably consists solely of the following compound (4), in view of the stability against the oxidation-reduction reaction, the stability of the structure and the viscosity. As the compound (4), one type may be used alone, or two or more types may be used in combination.

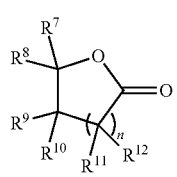

(4)

wherein each of $R^7$ to $R^{12}$ which are independent of one another, is a hydrogen atom, a fluorine atom, a chlorine atom, a $C_{1-2}$ alkyl group, a $C_{1-2}$ fluorinated alkyl group, or a $C_{2-3}$ alkyl group having at least one etheric oxygen atom, and n is an integer of from 1 to 3. $R^7$ to $R^{12}$ may be the same or different.

As $R^7$ to $R^{12}$, a hydrogen atom, a methyl group, an ethyl group or a fluorine atom is preferred, and a hydrogen atom, a methyl group or an ethyl group is more preferred, in view of the stability against the oxidation-reduction reaction, the viscosity and availability of the compound. n is preferably 1 to 3, more preferably 1 in view of the viscosity and availability of the compound.

The compound (4) may, for example, be a cyclic ester compound such as γ-butyrolactone, γ-valerolactone, γ-hexanolactone, δ-valerolactone or ε-caprolactone, or a compound having at least one of hydrogen atoms bonded to carbon atoms forming the ring of such a cyclic ester compound substituted by a fluorine atom, a chlorine atom, a $C_{1-2}$ alkyl group, a $C_{1-2}$ fluorinated alkyl group or a $C_{2-3}$ alkyl group having at least one etheric oxygen atom. As the compound (4), at least one member selected from the group consisting of γ-butyrolactone, γ-valerolactone and ε-caprolactone, is preferred, and γ-butyrolactone is more preferred, from the viewpoint of availability and since the effect to prevent thermal runaway is high.

(Compound (β))

The liquid composition preferably further contains at least one compound (β) selected from the group consisting of a saturated cyclic carbonate compound, a saturated chain carbonate compound having no fluorine atom (hereinafter sometimes referred to as a non-fluorinated saturated chain carbonate compound), a saturated cyclic sulfone compound (excluding a lithium salt) and a phosphoric acid ester compound, whereby the solubility of the lithium salt and the ion conductivity will be excellent.

The saturated cyclic carbonate compound may, for example, be propylene carbonate (PC), ethylene carbonate (EC) or 4-fluoro-1,3-dioxolan-2-one (FEC).

The non-fluorinated saturated chain carbonate compound may, for example, be dimethyl carbonate (DMC), ethyl methyl carbonate (EMC) or diethyl carbonate (DEC).

The saturated cyclic sulfolane compound may, for example, be sulfolane or 3-methylsulfolane.

The phosphoric acid ester compound may, for example, be trimethyl phosphate, triethyl phosphate or tris(2,2,2-trifluoroethyl)phosphate.

The liquid composition preferably contains the non-fluorinated saturated chain carbonate compound. When the non-fluorinated saturated cyclic carbonate compound is contained, the viscosity of the non-aqueous electrolyte solution can be lowered, and the lithium ion diffusion coefficient of the non-aqueous electrolyte solution and the ion conductivity of the non-aqueous electrolyte solution tend to be high.

[Other Components]

The non-aqueous electrolyte solution may contain other compounds (another solvent, additives, etc.) other than the lithium salt, the fluorine-containing solvent (α), the cyclic carboxylic acid ester compound and the compound (β) as the case requires within a range not to impair the effects of the present invention.

(Another Solvent)

The non-aqueous electrolyte solution may contain another solvent other than the fluorine-containing solvent (α), the cyclic carboxylic acid ester compound and the compound (β).

(Additives)

The non-aqueous electrolyte solution may contain known additives as the case requires in order to improve the functions of the non-aqueous electrolyte solution. Such additives may, for example, be overcharge-preventing agents, dehydrating agents, deoxidizing agents, property-improving assistants and surfactants.

Overcharge-Preventing Agents:

The overcharge-preventing agents may, for example, be an aromatic compound (such as biphenyl, an alkyl biphenyl, terphenyl, a partially hydrated product of terphenyl, cyclohexylbenzene, t-butylbenzene, t-amylbenzene, diphenyl ether or dibenzofuran), a partially fluorinated product of such an aromatic compound (such as 2-fluorobiphenyl, o-cyclohexylfluorobenzene or p-cyclohexylfluorobenzene) and a fluorine-containing anisole compound (such as 2,4-difluoroanisole, 2,5-difluoroanisole or 2,6-difluoroanisole). As the overcharge-preventing agent, one type may be used alone, or two or more types may be used in combination.

Dehydrating Agents:

The dehydrating agents may, for example, be molecular sieves, sodium sulfate, magnesium sulfate, calcium hydride, sodium hydride, potassium hydride, and lithium aluminum hydride. The liquid composition and another solvent to be used for the non-aqueous electrolyte solution are preferably ones which have been subjected to dehydration with such a dehydrating agent, followed by rectification. Otherwise, one which has been subjected only to dehydration with such a dehydrating agent without being subjected to rectification, may be used.

Property-Improving Assistants:

Property-improving assistants are to improve the cycle properties and capacity-maintaining properties after high temperature storage. The property-improving assistants may, for example, be an unsaturated carbonate compound (such as vinylene carbonate (VC), vinylethylene carbonate (VEC) or 4-ethynyl-1,3-dioxlan-2-one), a sulfur-containing compound (such as ethylene sulfite, 1,3-propane sultone, 1,4-butane sultone, methyl methanesulfonate, busulfan, sulfolene, dimethylsulfone, diphenylsulfone, methylphenylsulfone, dibutyl disulfide, dicyclohexyl disulfide, tetramethylthiuram monosulfide, N,N-dimethylmethane sulfonamide or N,N-diethylmethane sulfonamide), a hydrocarbon compound (such as heptane, octane or cycloheptane), and a fluorine-containing aromatic compound (such as fluorobenzene, difluorobenzene or hexafluorobenzene). As the property-improving assistant, one type may be used alone, or two or more types may be used in combination.

Surfactants:

Surfactants are to help impregnation of the non-aqueous electrolyte solution to the electrode assembly or to separators. The surfactants may be cationic surfactants, anionic surfactants, non-ionic surfactants or amphoteric surfactants, but anionic surfactants are preferred, since they are readily available and their surface activities are high. Further, as the surfactants, fluorine-containing surfactants are preferred, since their oxidizing resistance is high, and their cycle properties and rate properties are good. As the surfactants, one type may be used alone, or two or more types may be used in combination.

[Ratio of the Respective Components]
(Ratio of Lithium Salt)

The upper limit value for the content of the lithium salt in the non-aqueous electrolyte solution is not particularly limited and is preferably 1.5 mol/L, more preferably 1.4 mol/L, further preferably 1.3 mol/L. The lower limit value for the content of the lithium salt in the non-aqueous electrolyte solution is not particularly limited, and is preferably 0.7 mol/L, more preferably 0.8 mol/L, further preferably 0.9 mol/L.

When calculated by mass, the ratio of the mass of the lithium salt to the total mass of the non-aqueous electrolyte solution is preferably from 5 to 20 mass %, more preferably from 7 to 17 mass %, further preferably from 9 to 14 mass %.

When the ratio of the lithium salt is at least the lower limit value, the ion conductivity of the non-aqueous electrolyte solution tends to be high. When the ratio of the lithium salt is at most the upper limit value, the lithium salt is readily soluble uniformly in the liquid composition, and even under a low temperature condition, the lithium salt is less likely to be precipitated. Further, the lithium ions are likely to be diffused in the non-aqueous electrolyte solution, and the lithium ion diffusion coefficient tends to be high.

The non-aqueous electrolyte solution of the present invention preferably contains at least $LiPF_6$ as the lithium salt. The upper limit value for the molar ratio of $LiPF_6$ based on the total number of moles of the lithium salt contained in the non-aqueous electrolyte solution is preferably 99.5 mol %, more preferably 99 mol %. The lower limit value for the molar ratio of $LiPF_6$ is preferably 40 mol %, more preferably 50 mol %, further preferably 65 mol %, particularly preferably 80 mol %. When the molar ratio of $LiPF_6$ based on the total number of moles of the lithium salt is at least the lower limit value, a highly practical non-aqueous electrolyte solution excellent in the ion conductivity tends to be obtained.

(Ratio of Monofluorophosphate Anions and Difluorophosphate Anions)

The lower limit value for the ratio of the sum of the mass of the monofluorophosphate anions and the mass of the difluorophosphate anions to the total mass of the non-aqueous electrolyte solution is preferably 0.001 mass %, more preferably 0.005 mass %. When the ratio of the sum of the masses is at least the lower limit value, a lithium ion secondary battery of which the discharge capacity is less likely to decrease and which is less likely to generate a gas even when stored at high temperature, and which is excellent in the high temperature storage properties, tends to be obtained.

The upper limit value for the ratio of the sum of the mass of the monofluorophosphate anions and the mass of the difluorophosphate anions to the total mass of the non-aqueous electrolyte solution is preferably 2 mass %, more preferably 1 mass %, further preferably 0.5 mass %. When the ratio of the sum of the masses is at most the upper limit value, the solubility of the non-aqueous electrolyte solution when stored at low temperature is likely to be maintained, and an electrolyte solution excellent in the ion conductivity tends to be obtained.

(Ratio of Fluorine-Containing Solvent ($\alpha$))

The ratio of the mass of the fluorine-containing solvent ($\alpha$) to the total mass of the non-aqueous electrolyte solution is not particularly limited, however, the lower limit value for the ratio of the mass of the fluorine-containing solvent ($\alpha$) to the total mass of the non-aqueous electrolyte solution is preferably 30 mass %, more preferably 40 mass %, further preferably 45 mass %. The upper limit value for the ratio of the fluorine-containing solvent ($\alpha$) is preferably 80 mass %, more preferably 75 mass %, further preferably 73 mass %, particularly preferably 70 mass %.

When the ratio of the fluorine-containing solvent ($\alpha$) is at least the lower limit value, the obtainable non-aqueous electrolyte solution is excellent in flame retardance, has low positive electrode reactivity and negative electrode reactivity, is less likely to undergo thermal runaway and has a high level of high voltage resistance property. When the ratio of the fluorine-containing solvent ($\alpha$) is at most the upper limit value, the lithium salt can easily be uniformly dissolved, and the lithium salt is less likely to be precipitated at a low temperature.

The ratio of the mass of the fluorine-containing solvent ($\alpha$) to the total mass of the liquid composition is preferably from 30 to 90 mass %, more preferably from 35 to 85 mass %, further preferably from 40 to 80 mass %, particularly preferably from 45 to 75 mass %.

When the ratio of the fluorine-containing solvent ($\alpha$) is at least the lower limit value, the non-aqueous electrolyte solution is excellent in the flame retardance, has low positive electrode reactivity and negative electrode reactivity, is less likely to undergo thermal runaway and has a high level of high voltage resistance property. When the ratio of the fluorine-containing solvent ($\alpha$) is at most the upper limit value, the lithium salt can easily be uniformly dissolved, and the lithium salt is less likely to be precipitated at a low temperature.

The fluorine-containing solvent ($\alpha$) preferably contains the fluorine-containing ether compound, whereby high solubility of the lithium salt, and flame retardance and ion conductivity of the non-aqueous electrolyte solution will be achieved.

The ratio of the mass of the fluorine-containing ether compound to the total mass of the fluorine-containing solvent ($\alpha$) is preferably from 25 to 100 mass %, more preferably from 30 to 100 mass %, further preferably from 50 to 100 mass %, still further preferably from 60 to 100 mass %, particularly preferably from 70 to 100 mass %. The fluorine-containing solvent ($\alpha$) most preferably consists solely of the fluorine-containing ether compound.

The ratio of the mass of the fluorine-containing ether compound to the total mass of the non-aqueous electrolyte solution is preferably from 10 to 80 mass %. The lower limit value for the ratio of the fluorine-containing ether compound is more preferably 20 mass %, further preferably 30 mass %, particularly preferably 45 mass %. Further, the upper limit value for the ratio of the fluorine-containing ether compound is more preferably 75 mass %, further preferably 73 mass %, particularly preferably 70 mass %.

In a case where the fluorine-containing solvent ($\alpha$) contains the fluorine-containing chain carboxylic acid ester compound, the ratio of the mass of the fluorine-containing chain carboxylic acid ester compound to the total mass of the fluorine-containing solvent ($\alpha$) is preferably from 0.01 to 50 mass %, more preferably from 0.01 to 40 mass %, further preferably from 0.01 to 30 mass %, particularly preferably from 0.01 to 20 mass %.

In a case where the fluorine-containing solvent (α) contains the fluorine-containing chain carbonate compound, the ratio of the mass of the fluorine-containing chain carbonate compound to the total mass of the fluorine-containing solvent (α) is preferably from 0.01 to 50 mass %, more preferably from 0.01 to 40 mass %, further preferably from 0.01 to 30 mass %, particularly preferably from 0.01 to 20 mass %.

In a case where the fluorine-containing solvent (α) contains the fluorine-containing alkane compound, the ratio of the mass of the fluorine-containing alkane compound to the total mass of the non-aqueous electrolyte solution is preferably from 0.01 to 5 mass %.

When the ratio of the fluorine-containing alkane compound is at least 0.01 mass %, the non-aqueous electrolyte solution will be excellent in the flame retardance. When the ratio of the fluorine-containing alkane is at most 5 mass %, the solubility of the lithium salt tends to be maintained.

In a case where as the fluorine-containing solvent (α), the fluorine-containing ether compound and at least one member selected from the group consisting of the fluorine-containing chain carboxylic acid ester, the fluorine-containing chain carbonate compound and the fluorine-containing alkane compound are used in combination, their ratio may optionally be set.

(Ratio of Cyclic Carboxylic Acid Ester Compound)

The ratio of the mass of the cyclic carboxylic acid ester compound to the total mass of the non-aqueous electrolyte solution is preferably from 4 to 50 mass %, more preferably from 7 to 45 mass %, further preferably from 10 to 40 mass %, particularly preferably from 15 to 35 mass %.

When the ratio of the cyclic carboxylic acid ester compound is at least the lower limit value, the non-aqueous electrolyte solution is capable of uniformly dissolving the lithium salt, has low positive electrode reactivity and negative electrode reactivity, and is less likely to undergo thermal runaway. When the ratio of the cyclic carboxylic acid ester compound is at most the upper limit value, the non-aqueous electrolyte solution is excellent in the flame retardance.

The ratio of the mass of the cyclic carboxylic acid ester to the total mass of the liquid composition is preferably from 4 to 60 mass %, more preferably from 7 to 50 mass %, further preferably from 10 to 45 mass %, particularly preferably from 15 to 40 mass %.

When the ratio of the cyclic carboxylic acid ester is at least the lower limit value, the liquid composition is excellent in the solubility, has low positive electrode reactivity and negative electrode reactivity, is less likely to undergo thermal runaway, and has a high level of high voltage resistance property. When the ratio of the cyclic carboxylic acid ester is at most the upper limit value, the liquid composition is excellent in the flame retardance.

In the non-aqueous electrolyte solution, $N_A/N_{Li}$, i.e. the ratio of the total number of moles $N_A$ of the cyclic carboxylic acid ester compound to the total number of moles $N_{Li}$ of lithium atoms derived from the lithium salt, is not particularly limited, and is preferably from 1.5 to 7.0. The lower limit value for such $N_A/N_{Li}$ is more preferably 2, further preferably 2.5, particularly preferably 3. Further, the upper limit value for such $N_A/N_{Li}$ is preferably 6.5, more preferably 6, further preferably 5, particularly preferably 4.5, most preferably 4.2.

When such $N_A/N_{Li}$ is within the above range, while the lithium salt is uniformly dissolved to obtain a sufficient ion conductivity, the reactivity of the non-aqueous electrolyte solution with the positive electrode and the negative electrode can be reduced, and thermal runaway of a secondary battery can be suppressed, from the following reasons.

It is estimated that when the non-aqueous electrolyte solution is used for a secondary battery, particularly on a positive electrode, the cyclic carboxylic acid ester compound forms a stable coating film on an electrode active material, the coating film inhibits the reaction of the electrode and the non-aqueous electrolyte solution and thus suppresses thermal runaway. It is considered that when such $N_A/N_{Li}$ is at least the lower limit value, the non-aqueous electrolyte solution contains the cyclic carboxylic acid ester compound sufficiently, and thus the coating film is sufficiently formed to sufficiently suppress the reaction of the electrode with the non-aqueous electrolyte solution, thereby to sufficiently suppress thermal runaway. Further, the cyclic carboxylic acid ester compound is considered to have high affinity with the lithium salt and to promote dissolution of the lithium salt in a solvent. When such $N_A/N_{Li}$ is at least the lower limit value, the lithium salt tends to be sufficiently dissolved in the solvent, whereby an electrolyte solution having a practically sufficient ion conductivity tends to be obtained. Here, the fluorine-containing compound such as the fluorine-containing ether compound, the fluorine-containing chain carboxylic acid ester compound or the fluorine-containing chain carbonate compound is considered to have a low affinity with the lithium salt, and tends to have a very low effect to promote dissolution of the lithium salt in a solvent.

The coating film formed on the electrode active material is considered to be easily soluble in a highly polar solvent, and it is estimated that in a highly polar solvent, the coating film is dissolved even if formed, and thus formation of the coating film tends to be insufficient. It is considered that when such $N_A/N_{Li}$ is at most the upper limit value, the content of the cyclic carboxylic acid ester compound in the non-aqueous electrolyte solution will not be too high, the polarity of the entire non-aqueous electrolyte solution will be within an appropriate range, and thus the coating film formed on the electrode active material is less likely to be dissolved. It is considered that a sufficient coating film is maintained on the electrode active material, whereby an exothermal reaction by the electrode and the non-aqueous electrolyte solution is less likely to occur and thus thermal runaway is less likely to occur. Here, the fluorine-containing compound such as the fluorine-containing ether compound, the fluorine-containing chain carboxylic acid ester compound or the fluorine-containing chain carbonate compound is considered to have a very low effect to dissolve the coating film since it has a low polarity. Further, by the low content of the flammable cyclic carboxylic acid ester compound, the flame retardance of the non-aqueous electrolyte solution will improve.

(Ratio of Compound (β))

In a case where the liquid composition contains the compound (β), the ratio of the mass of the compound (β) to the total mass of the non-aqueous electrolyte solution is preferably from 0.01 to 30 mass %, more preferably from 0.1 to 20 mass %. The lower limit value for the ratio of the mass of the compound (β) to the total mass of the non-aqueous electrolyte solution is 0 mass %.

When the ratio of the compound (β) is at most the upper limit value, the reaction of the compound (β) and the electrode tends to be suppressed, and a non-aqueous electrolyte solution excellent in the stability will be obtained. Further, the content of the fluorine-containing solvent (α)

can be increased, whereby a non-aqueous electrolyte solution excellent in the flame retardance tends to be obtained.

In a case where the liquid composition contains the saturated cyclic carbonate compound, the ratio of the mass of the saturated cyclic carbonate compound to the total mass of the non-aqueous electrolyte solution is preferably from 0.01 to 20 mass %, more preferably from 0.01 to 15 mass %, further preferably from 0.01 mass % to 10 mass %, particularly preferably from 0.01 to 5 mass %.

When the ratio of the saturated cyclic carbonate compound is at most the upper limit value, the saturated cyclic carbonate compound is less likely to be reacted with the electrode, the non-aqueous electrolyte solution tends to be excellent in the stability and be excellent in the flame retardance.

In a case where the liquid composition contains the non-fluorinated saturated chain carbonate compound, the ratio of the mass of the non-fluorinated saturated chain carbonate compound to the total mass of the non-aqueous electrolyte solution is preferably from 0.01 to 30 mass %, more preferably from 0.01 to 20 mass %, further preferably from 0.01 to 15 mass %, particularly preferably from 0.1 to 15 mass %, most preferably from 1 to 15 mass %.

When the ratio of the non-fluorinated saturated chain carbonate compound is at most the upper limit value, the non-fluorinated saturated chain carbonate compound is less likely to be reacted with the electrode, and the non-aqueous electrolyte solution tends to be excellent in the stability and be excellent in the flame retardance.

In a case where the liquid composition contains the saturated cyclic carbonate compound and the non-fluorinated saturated chain carbonate compound, the ratio of the sum of the mass of the saturated cyclic carbonate compound and the mass of the non-fluorinated saturated chain carbonate compound to the total mass of the non-aqueous electrolyte solution is preferably from 0.01 to 30 mass %, more preferably from 0.01 to 20 mass %, further preferably from 0.01 to 15 mass %.

When the ratio of the sum of the masses is at most the upper limit value, even when the saturated cyclic carbonate compound and the non-fluorinated saturated chain carbonate compound are used, dissolution of the coating film of the cyclic carboxylic acid ester compound by a high polarity of solvent can be suppressed, the reactivity with the electrode can be suppressed, and a non-aqueous electrolyte solution having an excellent stability tends to be obtained. Further, the content of the flammable compounds can be suppressed, whereby a non-aqueous electrolyte solution having excellent flame retardance tends to be obtained.

In a case where the liquid composition contains a saturated cyclic sulfone compound, the ratio of the mass of the saturated cyclic sulfone compound to the total mass of the non-aqueous electrolyte solution is preferably from 0.01 to 20 mass %, more preferably from 0.01 to 15 mass %, further preferably from 0.01 to 10 mass %, particularly preferably from 0.01 to 5 mass %.

When the ratio of the saturated cyclic sulfone compound is at most the upper limit value, the saturated cyclic sulfone compound is less likely to be reacted with the electrode, the non-aqueous electrolyte solution tends to be excellent in the stability and be excellent in the flame retardance.

In a case where the liquid composition contains the phosphoric acid ester compound, the ratio of the mass of the phosphoric acid ester compound to the total mass of the non-aqueous electrolyte solution is preferably from 0.01 to 5 mass %.

When the ratio of the phosphoric acid ester compound is at most the upper limit value, the phosphoric acid ester compound is less likely to be reacted with the electrode, and the non-aqueous electrolyte solution tends to be excellent in the stability and be excellent in the flame retardance.

When the liquid composition contains the compound (β), the ratio of the mass of the cyclic carboxylic acid ester compound to the total mass of the cylcid carboxylic acid ester compound and the compound (β) is preferably from 30 to 100 mass %, more preferably from 35 to 100 mass %, further preferably from 40 to 100 mass %, still more preferably from 45 to 100 mass %, particularly preferably from 50 to 100 mass %.

When the ratio of the cyclic carboxylic acid ester compound is within the above range, the reactivity of the non-aqueous electrolyte solution with the positive electrode and the negative electrode can be reduced, and thermal runaway of a secondary battery can be suppressed.

In a case where the liquid composition contains the compound (β), $(N_A+N_B)/N_{Li}$, i.e. the ratio of the sum of the total number of moles $N_A$ of the cyclic carboxylic acid ester compound and the total number of moles $N_B$ of the compound (β) to the total number of moles $N_{Li}$ of lithium atoms derived from the lithium salt is preferably from 3.0 to 7.0. The lower limit value for such $(N_A+N_B)/N_{Li}$ is more preferably 3.2, further preferably 3.5. Further, the upper limit value for such $(N_A+N_B)/N_{Li}$ is more preferably 6.5, further preferably 6, particularly preferably 5.5, most preferably 4.5.

The compound (β) is considered to have a high affinity with the lithium salt and to have an effect to promote dissolution of the lithium salt in a solvent, in the same manner as the cyclic carboxylic acid ester compound. When such $(N_A+N_B)/N_{Li}$ is at least the lower limit value, that is, the total amount of the compound (β) and the cyclic carboxylic acid ester compound considered to have a high effect to promote dissolution of the lithium salt is at a certain level or more relative to the amount of the lithium salt, solubility of the lithium salt in the fluorine-containing solvent (α) improves and thus the ion conductivity of the non-aqueous electrolyte solution improves, and particularly in a case where the lithium salt such as $LiPF_6$ which is hardly soluble in the fluorinated solvent can be soluble in the fluorinated solvent, and practically sufficient ion conductivity tends to be obtained.

When the solvent has a high polarity, the coating film of the cyclic carboxylic acid ester compound formed on the electrode active material is dissolved, and formation of the coating film tends to be insufficient. The compound (β) is considered to have an effect to dissolve the coating film since it has a high polarity. When such $((N_A+N_B)/N_{Li}$ is at most the upper limit value, that is, the total content of the compound (β) and the cyclic carboxylic acid ester compound having an effect to dissolve the coating film is at a certain level or less relative to the lithium salt, it is considered that the solubility of the coating film is low and formation of the coating film is less likely to be insufficient. Accordingly, it is estimated that the reactivity of the non-aqueous electrolyte solution with the positive electrode and the negative electrode tends to be lower, and thermal runaway of a secondary battery is less likely to occur. Further, the contents of the flammable cyclic carboxylic acid ester compound and the compound (β) in the non-aqueous electrolyte solution are reduced, whereby the flame retardance of the non-aqueous electrolyte solution will improve.

Particularly by using the lithium salt containing $LiPF_6$ and by adjusting $N_A/N_{Li}$ and $(N_A+N_B)/N_{Li}$ to be within the above ranges, a non-aqueous electrolyte solution having both practically sufficient ion conductivity and excellent stability with which thermal runaway is less likely to occur, tends to be obtained.

(Ratio of Other Components)

In a case where the non-aqueous electrolyte solution contains another solvent, the ratio of the sum of the mass of such another solvent and the mass of the compound (β) to the total mass of the non-aqueous electrolyte solution is preferably from 0.01 to 30 mass %, more preferably from 0.1 to 20 mass %. When the ratio of the sum of the mass of another solvent and the mass of the compound (β) is at most the upper limit value, the reaction of such another solvent and the compound (β) with the electrode is easily suppressed, and a non-aqueous electrolyte solution excellent in the stability will be obtained. Further, the content of the fluorine-containing solvent (α) can be increased, whereby a non-aqueous electrolyte solution excellent in the flame retardance tends to be obtained.

In a case where the non-aqueous electrolyte solution contains as another solvent a nitrile compound, the ratio of the mass of the nitrile compound to the total mass of the non-aqueous electrolyte solution is preferably at most 10 mass %, more preferably at most 5 mass %, further preferably at most 3 mass %, whereby a non-aqueous electrolyte solution which has lower reactivity with the positive electrode and the negative electrode and which is less likely to undergo thermal runaway tends to be obtained.

In a case where the non-aqueous electrolyte solution contains as another solvent an ether compound having no fluorine atom, the ratio of the mass of the ether compound having no fluorine atom to the total mass of the non-aqueous electrolyte solution is preferably at most 10 mass %, more preferably at most 5 mass %, further preferably at most 3 mass %, particularly preferably at most 1 mass %, whereby a non-aqueous electrolyte solution which has lower reactivity with the positive electrode and the negative electrode and which is less likely to undergo thermal runaway tends to be obtained.

In a case where the non-aqueous electrolyte solution contains an overcharge-preventing agent, the ratio of the mass of the overcharge-preventing agent to the total mass of the non-aqueous electrolyte solution is preferably from 0.01 to 5 mass %.

When the ratio of the overcharge-preventing agent is within the above range, it becomes easier to prevent breakage or ignition of the secondary battery by overcharge, whereby the secondary battery can be used more safely.

In a case where the non-aqueous electrolyte solution contains a property-improving assistant, the ratio of the mass of the property-improving assistant to the total mass of the non-aqueous electrolyte solution is preferably from 0.01 to 5 mass %.

In a case where the non-aqueous electrolyte solution contains a surfactant, the ratio of the mass of the surfactant to the total mass of the non-aqueous electrolyte is preferably from 0.05 to 5 mass %, more preferably from 0.05 to 3 mass %, further preferably from 0.05 to 2 mass %.

[Function and Effect]

The above-described non-aqueous electrolyte solution of the present invention is flame retardant since it contains the fluorine-containing solvent (α).

Further, since the above-described non-aqueous electrolyte solution of the present invention comprises either one or both of monofluorophosphate anions and difluorophosphate anions derived from the electrolyte salt, a lithium ion secondary battery of which the discharge capacity is less likely to decrease even when storage at high temperature, which is less likely to generate a gas and which is excellent in the high temperature storage properties tends to be obtained. The mechanism why such effects are obtained is not necessarily clearly understood, and it is considered that such effects are obtained because the monofluorophosphate anions and the difluorophosphate anions are decomposed to form a coating film on the positive electrode.

Further, the reactivity of the non-aqueous electrolyte solution of the present invention, which comprises the cyclic carboxylic acid ester compound, with the positive electrode and the negative electrode, is low, the heating value due to the reaction is reduced, and accordingly thermal runaway is less likely to occur.

<Lithium Ion Secondary Battery>

The lithium ion secondary battery of the present invention comprises a positive electrode, a negative electrode and the non-aqueous electrolyte solution of the present invention.

[Positive Electrode]

The positive electrode may be an electrode wherein a positive electrode layer containing a positive electrode active material, a conductivity-imparting agent and a binder, is formed on a current collector.

(Positive Electrode Active Material)

The positive electrode active material may be any material so long as it is capable of absorbing and desorbing lithium ions. As the positive electrode active material, known positive electrode active material for conventional lithium ion secondary batteries may be employed. For example, a lithium-containing transition metal oxide, a lithium-containing transition metal composite oxide using at least one transition metal, a transition metal oxide, a transition metal sulfide, a metal oxide or an olivine type metal lithium salt may be mentioned. As the positive electrode active material, one type may be used alone, or two or more types may be used in combination.

The lithium-containing transition metal oxide may, for example, be lithium cobalt oxide ($LiCoO_2$), lithium nickel oxide ($LiNiO_2$) or lithium manganese oxide ($LiMnO_2$, $LiMn_2O_4$ or $Li_2MnO_3$).

As a metal for the lithium-containing transition metal composite oxide, Al, V, Ti, Cr, Mn, Fe, Co, Li, Ni, Cu, Zn, Mg, Ga, Zr, Si or Yb is, for example, preferred. The lithium-containing transition metal composite oxide may, for example, be a lithium ternary composite oxide (such as $Li(Ni_aCo_bMn_c)O_2$ (wherein a, b, c≥0, a+b+c=1)) or one having a part of the transition metal atom which mainly constitutes such a lithium transition metal composite oxide substituted by another metal such as Al, Ti, V, Cr, Mn, Fe, Co, Li, Ni, Cu, Zn, Mg, Ga, Zr, Si or Yb.

The lithium-containing transition metal composite oxide may, for example, be specifically $LiMn_{0.5}Ni_{0.5}O_2$, $LiMn_{1.8}Al_{0.2}O_4$, $LiNi_{0.85}Co_{0.10}Al_{0.05}O_2$, $LiMn_{1.5}Ni_{0.5}O_4$, $LiNi_{1/3}Co_{1/3}Mn_{1/3}O_2$ or $LiMn_{1.8}Al_{0.2}O_4$.

The transition metal oxide may, for example, be $TiO_2$, $MnO_2$, $MoO_3$, $V_2O_5$, or $V_6O_{13}$. The transition metal sulfide may, for example, be $TiS_2$, FeS or $MoS_2$. The metal oxide may, for example, be $SnO_2$ or $SiO_2$.

The olivine type metal lithium salt is a substance represented by the formula $Li_LX_xY_yO_zF_g$ (wherein X is Fe(II), Co(II), Mn(II), Ni(II), V(II) or Cu(II), Y is P or Si, and L, x, y, z and g are, respectively, 0≤L≤3, 1≤x≤2, 1≤y≤3, 4≤z≤12 and 0≤g≤1) or a composite thereof. It may, for example, be specifically $LiFePO_4$, $Li_3Fe_2(PO_4)_3$, $LiFeP_2O_7$, $LiMnPO_4$, $LiNiPO_4$, $LiCoPO_4$, $Li_2FePO_4F$, $Li_2MnPO_4F$, $Li_2NiPO_4F$, $Li_2CoPO_4F$, $Li_2FeSiO_4$, $Li_2MnSiO_4$, $Li_2NiSiO_4$ or $Li_2CoSiO_4$.

Such a positive electrode active material having on its surface an attached substance having a composition different from the substance constituting the positive electrode active material as the main component may also be used. The surface-attached substance may, for example, be an oxide (such as aluminum oxide, silicon oxide, titanium oxide, zirconium oxide, magnesium oxide, calcium oxide, boron oxide, antimony oxide or bismuth oxide), a sulfate (such as lithium sulfate, sodium sulfate, potassium sulfate, magnesium sulfate, calcium sulfate or aluminum sulfate), or a carbonate (such as lithium carbonate, calcium carbonate or magnesium carbonate).

The amount of the surface-attached substance to the positive electrode active material is preferably at least 0.1 mass ppm and at most 20 mass %, more preferably at least 1 mass ppm and at most 10 mass %, particularly preferably at least 10 mass ppm and at most 5 mass %. By the surface-attached substance, it is possible to suppress an oxidation reaction of the non-aqueous electrolyte solution at the surface of the positive electrode active material and thereby to improve the battery life.

The positive electrode active material is preferably a lithium-containing composite oxide having an α-NaCrO$_2$ structure as matrix (such as LiCoO$_2$, LiNiO$_2$ or LiMnO$_2$) or a lithium-containing composite oxide having a spinel structure as matrix (such as LiMn$_2$O$_4$) since its discharge voltage is high and its electrochemical stability is high.

(Conductivity-Imparting Agent)

The conductivity-imparting agent may, for example, be a carbon material, a metal material (such as Al) or a powder of a conductive oxide.

(Binder)

The binder may, for example, be a resin binder (such as polyvinylidene fluoride) or a rubber binder (such as hydrocarbon rubber or fluorine-containing rubber).

(Current Collector)

The current collector may be a thin metal film composed mainly of e.g. Al.

[Negative Electrode]

The negative electrode may be an electrode wherein a negative electrode layer containing a powdery negative electrode active material, a conductivity-imparting agent and a binder, is formed on a current collector. In a case where the negative electrode active material can maintain the shape by itself (e.g. a thin lithium metal film), the negative electrode may be formed solely of the negative electrode active material.

(Negative Electrode Active Material)

The negative electrode active material may be at least one member selected from the group consisting of lithium metal, a lithium alloy and a carbon material capable of absorbing and desorbing lithium ions.

The lithium alloy may, for example, be a Li—Al alloy, a Li—Pb alloy or a Li—Sn alloy.

The carbon material may, for example, be graphite, coke or hard carbon.

(Conductivity-Imparting Agent, Binder)

As the binder and conductivity-imparting agent for the negative electrode, ones equal to those for the positive electrode may be used.

(Current Collector)

The current collector may be a thin metal film composed mainly of e.g. Cu.

[Separator]

Between the positive electrode and the negative electrode, a separator is interposed in order to prevent short circuiting. Such a separator may, for example, be a porous film. In such a case, the non-aqueous electrolyte solution is used as impregnated to the porous film. Further, such a porous film having the non-aqueous electrolyte solution impregnated and gelated, may be used as a gel electrolyte.

As the porous film, one which is stable against the non-aqueous electrolyte solution and is excellent in the liquid-maintaining property, may be used. The porous film is preferably a porous sheet or a non-woven fabric.

The material of the porous film may, for example, be a fluororesin (such as polyvinylidene fluoride, polytetrafluoroethylene or a copolymer of ethylene and tetrafluoroethylene), a polyimide, or a polyolefin (such as polyethylene or polypropylene), and is preferably a polyolefin in view of the oxidation resistance, air permeability, availability, etc.

[Battery Exterior Package]

The material for a battery exterior package may, for example, be nickel-plated iron, stainless steel, aluminum or its alloy, nickel, titanium, a resin material, or a film material.

[Shape]

The shape of the lithium ion secondary battery may be selected depending upon the particular application, and it may be a coin-form, a cylindrical form, a square form or a laminate form. Further, the shapes of the positive electrode and the negative electrode may also be suitably selected to meet with the shape of the secondary battery.

[Charging Voltage]

The charging voltage of the lithium ion secondary battery of the present invention is preferably at least 3.4 V, more preferably at least 4.0 V, further preferably at least 4.2 V. In a case where the positive electrode active material is a lithium-containing transition metal oxide, a lithium-containing transition metal composite oxide, a transition metal oxide, a transition metal sulfide or a metal oxide, the charging voltage is preferably at least 4.0 V, more preferably at least 4.2 V. In a case where the positive electrode active material is an olivine type metal lithium salt, the charging voltage is preferably at least 3.2 V, more preferably at least 3.4 V.

[Function and Effect]

The above-described lithium ion secondary battery of the present invention, which employs the non-aqueous electrolyte solution of the present invention, is excellent in the high temperature storage properties, and is less likely to undergo thermal runaway. Further, since it employs the frame-retardant non-aqueous electrolyte solution of the present invention, it can be used safely.

EXAMPLES

Now, the present invention will be described in detail with reference to Examples, but it should be understood that the present invention is by no means restricted by the following description. Ex. 1 to 17 are Examples of the present invention, and Ex. 18 to 20 are Comparative Examples. Abbreviations in the following description are as follows.

(Lithium Salt)

LPF: LiPF$_6$

DPF: LiPO$_2$F$_2$ (DPF was prepared in accordance with the method in Inorganic Nuclear Chemistry Letters (1969), 5(7), pages 581 to 582)

(Fluorine-Containing Solvent (α))

AE3000: CF$_3$CH$_2$OCF$_2$CHF$_2$ (tradename: AE-3000, manufactured by Asahi Glass Company, Limited)

HFE5510: CHF$_2$CF$_2$CH$_2$OCF$_2$CHFCF$_3$

HFE458: CHF$_2$CF$_2$CH$_2$OCF$_2$CHF$_2$

MFA: methyl difluoroacetate (Cyclic Carboxylic Acid Ester Compound)
GBL: γ-butyrolactone
(Compound (β))
EC: ethylene carbonate
EMC: ethylmethyl carbonate
DMC: dimethyl carbonate
DEC: diethyl carbonate
FEC: fluoroethylene carbonate
(Other Component)
VC: vinylene carbonate
[Evaluation of Capacity Retention Rate and Gas Generation Amount when Stored at High Temperature]
(Preparation of Negative Electrode)

A step of mixing artificial graphite (4.25 g) and acetylene black (0.15 g) as an electrically conductive material, followed by stirring at a rotational speed of 2,000 rpm for one minute by means of a planetary centrifugal mixer (Awatorirentaro AR-E310, manufactured by Thinky Corporation), was repeated 3 times. Then, a step of adding a 1 mass % carboxymethyl cellulose aqueous solution (4.25 g), followed by stirring at a rotational speed of 2,000 rpm for 5 minutes by means of the above mixer, was repeated twice. Further, a 1 mass % carboxymethyl cellulose aqueous solution (4.25 g) was added, followed by stirring at a rotational speed of 2,000 rpm for 10 minutes by means of the above mixer. Then, a styrene-butadiene rubber aqueous dispersion latex (0.13 g) having a solid content concentration adjusted to 40 mass %, was added, followed by stirring at a rotational speed of 2,000 rpm for 5 minutes by means of the above mixer to obtain a slurry for forming an electrode.

On a copper foil having a thickness of 20 μm, the above slurry was applied and dried, and the copper foil was cut into a rectangular shape of 5.5 cm×4.5 cm to obtain an electrode (negative electrode) for evaluation.

(Preparation of Positive Electrode)

A step of mixing LiCoO$_2$ (trade name: "Selion C", manufactured by AGC Seimi Chemical Co. Ltd., 32.0 g) and carbon black (trade name: "Denka black", manufactured by Denki Kagaku Kogyo K.K., 0.80 g), followed by stirring at a rotational speed of 2,000 rpm for one minute by means of the above mixer was repeated 3 times. Then, a step of adding N-methyl-2-pyrrolidone (7.50 g), followed by stirring at a rotational speed of 2,000 rpm for 3 minutes by means of the above mixer, was repeated 3 times. Then, a step of adding N-methyl-2-pyrrolidone (1.0 g), followed by stirring at a rotational speed of 2,000 rpm for 3 minutes by means of the above mixer, was repeated 3 times. Further, an N-methyl-2-pyrrolidone solution of polyvinylidene fluoride (11 mass %, 7.45 g) was added, followed by stirring at a rotational speed of 2,000 rpm for one minute by means of the above mixer to obtain a slurry. On an aluminum foil having a thickness of 20 μm, the above slurry was applied and dried, and the aluminum foil was cut into a rectangular shape of 5.2 cm×4.2 cm to obtain an electrode (positive electrode) for evaluation.

(Preparation of Battery for Evaluation)

The obtained positive electrode and the negative electrode were disposed to face each other, and between the electrodes, a polyolefin type porous membrane was interposed as a separator to prepare a battery element. The obtained battery element was inserted into a bag consisting of a laminate film having an aluminum foil, both surfaces of which were covered with a resin film, so that the terminal protruded. Then, the non-aqueous electrolyte solution (1.0 mL) as shown in Table 1 as the non-aqueous electrolyte solution, was injected, followed by vacuum sealing to prepare a battery for evaluation comprising LiCoO$_2$ electrode-graphite electrode. The capacity of the prepared battery for evaluation had a capacity of 200 mA in 4.3V charge-3.0V discharge.

(Evaluation Method)

The battery for evaluation was dipped in an ethanol bath to measure the volume V1 before storage.

The battery for evaluation was pressurized as sandwiched between resin plates, and in such a sate, it was charged to 3.4 V at a constant current corresponding to 0.05 C at 25° C. and further charged to 4.3 V at a current corresponding to 0.2 C, and further, charged until the current value at the charging lower limit voltage became a current corresponding to 0.02 C. Thereafter, discharging to 3.0 V was carried out at a current corresponding to 0.2 C.

In each of cycles 2 to 4, charging to 4.3 V was carried out at a current corresponding to 0.2 C, and further, charging was carried out until the current value at the charging lower limit voltage became a current corresponding to 0.02 C. Thereafter, discharging to 3.0 V was carried out at a current corresponding to 0.2 C.

In cycle 5, charging to 4.3 V was carried out at a current corresponding to 1.0 C, and further, charging was carried out until the current value at the charging lower limit voltage became a current corresponding to 0.02 C. Thereafter, the battery was stored at 60° C. for 14 days and then discharged to 3.0 V at a current corresponding to 0.2 C at 25° C., and the discharge capacity was measured and regarded as the discharge capacity after storage. The capacity retention rate was calculated in accordance with the following formula.

Capacity retention rate (%)=((discharge capacity after storage)/(charge capacity in cycle 5))×100

Further, the battery for evaluation after discharging was dipped in an ethanol bath to measure the volume V2 after storage, and the amount of a gas generated when the battery was stored at high temperature was calculated from the volume change (V2−V1) between before and after the storage.

[Evaluation of Negative Electrode Reactivity]
(Preparation of Evaluation Sample)

An electrode (negative electrode) for evaluation was prepared in the same manner as in [Evaluation of capacity retention rate and gas generation amount when stored at high temperature] except that the cupper foil was punched into a circler shape having a diameter of 19 mm. Further, a lithium metal foil punched into a circular shape having a diameter of 19 mm was used as a counter electrode. Such electrodes were disposed with a polyolefin type porous membrane as a separator interposed therebetween, and a non-aqueous electrolyte solution having VC added at a concentration of 2 mass % to 0.5 mL of a carbonate non-aqueous electrolyte solution (a non-aqueous electrolyte solution having LPF dissolved at a concentration of 1.0 M in a mixture of EC:EMC in a mass ratio of 3:7, manufactured by KISHIDA CHEMICAL Co., Ltd.) was injected to prepare a single electrode cell comprising graphite electrode-lithium metal foil.

The obtained single electrode cell was subjected to the following charge/discharge cycles. In cycle 1, at 25° C., constant current charging to 0.2 V (negative electrode) was carried out at a current corresponding to 0.04 C, constant current charging to 0.05 V was carried out at a current corresponding to 0.2 C, and further constant voltage charging was carried out until the current value at the charging lower limit voltage became a current corresponding to 0.02 C. Thereafter, constant current discharging to 1.0 V was carried out at a current corresponding to 0.2 C.

In cycles 2 to 4, constant current charging to 0.05 V was carried out at a current corresponding to 0.2 C, and further, constant voltage charging was carried out until the current value at the charging lower limit voltage became a current corresponding to 0.02 C. Thereafter, constant current discharging to 1.0 V was carried out at a current corresponding to 0.2 C.

Thereafter, constant current charging to 0.05 V was carried out at a current corresponding to 0.2 C. Then, the obtained single electrode cell in a charged state was disassembled in an argon atmosphere to obtain a negative electrode in a charged state. The obtained negative electrode was washed with DMC (2 mL) three times, vacuum dried and punched out into a circular shape having a diameter of 5 mm, which was put in a sealed vessel made of stainless steel (SUS), and 2 μL of the non-aqueous electrolyte solution obtained in each EX. was further put, followed by sealing to prepare an evaluation sample.

(Evaluation Method)

Each of the obtained evaluation samples was subjected to measurement by a differential scanning calorimeter (manufactured by SII NanoTechnology Inc., DSC-6000) within a temperature range of from 50 to 350° C. at a temperature-raising rate of 5° C./min.

The negative electrode reactivity was evaluated based on "the exothermic peak temperature" and "the heating value at 200° C.".

"The exothermic peak temperature" was a temperature at the peak top of the exothermic peak at the lowest temperature among exothermic peaks with a heating value exceeding 2,000 μW, based on the heating value at 60° C. in the above measurement (corrected to 0 μW). The exothermic peak temperature was evaluated based on standards ⊚ (excellent): 200° C. or higher, ○ (good): 180° C. or more and less than 200° C., Δ (poor): 150° C. or more and less than 180° C., and × (very poor): less than 150° C.

"The heating value at 200° C." was the heating value (μW) at 200° C. based on the heating value at 60° C. in the above measurement (corrected to 0 μW).

[Evaluation of Positive Electrode Reactivity]
(Preparation of Evaluation Sample)

An electrode (positive electrode) for evaluation was prepared in the same manner as in [Evaluation of capacity retention rate and gas generation amount when stored at high temperature] except that the aluminum foil was punched into a circler shape having a diameter of 18 mm. Further, a lithium metal foil punched into a circular shape having a diameter of 19 mm was used as a counter electrode. Such electrodes were disposed with a polyolefin type porous membrane as a separator interposed therebetween, and 0.5 mL of a carbonate non-aqueous electrolyte solution (a non-aqueous electrolyte solution having LPF dissolved at a concentration of 1.0 M in a mixture of EC:EMC in a mass ratio of 3:7, manufactured by KISHIDA CHEMICAL Co., Ltd.) was injected to prepare a single electrode cell comprising $LiCoO_2$ electrode-lithium metal foil.

The obtained single electrode cell was subjected to the following charge/discharge cycles. In cycles 1 to 4, constant current charging to 4.5 V was carried out at a current corresponding to 0.5 C, and further, constant voltage charging was carried out until the current value at the charging lower limit voltage became a current corresponding to 0.02 C. Thereafter, constant current discharging to 3.0 V was carried out at a current corresponding to 0.2 C.

Thereafter, constant current charging to 4.5 V was carried out at a current corresponding to 0.5 C, and further, constant voltage charging was carried out until the current value at the charging lower limit voltage became a current corresponding to 0.02 C. Then, the obtained single electrode cell in a charged state was disassembled in an argon atmosphere to obtain a positive electrode in a charged state. The obtained positive electrode was washed with DMC (2 mL) three times, vacuum dried and punched out into a circular shape having a diameter of 5 mm, which was put in a sealed vessel made of SUS, and 2 μL of the non-aqueous electrolyte solution in each EX. was further put, followed by sealing to prepare an evaluation sample.

(Evaluation Method)

Each of the obtained evaluation samples was subjected to measurement by a differential scanning calorimeter (manufactured by SII NanoTechnology Inc., DSC-6000) within a temperature range of from 50 to 350° C. at a temperature-raising rate of 5° C./min. The positive electrode reactivity was evaluated based on "the exothermic peak temperature" and "the heating value at 200° C." in the same manner as the evaluation of the negative electrode reactivity.

Ex. 1

LPF (0.15 g) and DPF (1.5 mg) as lithium salts were dispersed in AE3000 (0.31 g) as a fluorine-containing solvent (α), and GBL (0.35 g) as a cyclic carboxylic acid ester compound was mixed to obtain a uniform solution. Then, VC (0.03 g) was added to the solution to obtain a non-aqueous electrolyte solution 1.

Ex. 2 to 20

Non-aqueous electrolyte solutions 2 to 20 were obtained in the same manner as in Ex. 1 except that the composition of the respective compounds such as the lithium salts was changed as identified in Tables 1 to 3.

The results of evaluation of the capacity retention rate and the gas generation amount when stored at high temperature in the respective Ex are shown in Tables 1 to 3. Further, the results of evaluation of the negative electrode reactivity and the positive electrode reactivity in Ex. 2, 4, 8, 13, 15, 17 and 20 are shown in Table 4.

TABLE 1

|  |  |  | Ex. 1 | Ex. 2 | Ex. 3 | Ex. 4 | Ex. 5 | Ex. 6 | Ex. 7 |
|---|---|---|---|---|---|---|---|---|---|
| Non-aqueous electrolyte solution | | | 1 | 2 | 3 | 4 | 5 | 6 | 7 |
| Lithium salt | LPF | g | 0.15 | 0.15 | 0.15 | 0.15 | 0.15 | 0.15 | 0.15 |
|  |  | mmol | 1.0 | 1.0 | 1.0 | 1.0 | 1.0 | 1.0 | 1.0 |
|  |  | mass % | 9.7 | 9.6 | 9.6 | 9.4 | 9.2 | 9.6 | 9.8 |
|  | DPF | mg | 1.5 | 7.6 | 15.2 | 7.8 | 7.9 | 7.6 | 7.5 |
|  |  | mmol | 0.01 | 0.07 | 0.14 | 0.07 | 0.07 | 0.07 | 0.07 |
|  |  | mass % | 0.10 | 0.5 | 1.0 | 0.5 | 0.5 | 0.5 | 0.5 |

TABLE 1-continued

|  |  |  | Ex. 1 | Ex. 2 | Ex. 3 | Ex. 4 | Ex. 5 | Ex. 6 | Ex. 7 |
|---|---|---|---|---|---|---|---|---|---|
| Fluorine-containing solvent (α) | AE3000 | g | 1.02 | 1.02 | 1.02 | — | — | 1.02 | 0.92 |
|  |  | mL | 0.69 | 0.69 | 0.69 | — | — | 0.69 | 0.62 |
|  | HFE458 | g | — | — | — | 1.06 | — | — | — |
|  |  | mL | — | — | — | 0.69 | — | — | — |
|  | HFE5510 | g | — | — | — | — | 1.08 | — | — |
|  |  | mL | — | — | — | — | 0.69 | — | — |
|  | Content | mass % | 65.7 | 65.4 | 65.1 | 66.3 | 66.7 | 65.5 | 60.0 |
| Cyclic carboxylic acid ester compound | GBL | g | 0.35 | 0.35 | 0.35 | 0.35 | 0.35 | 0.35 | 0.35 |
|  |  | mL | 0.30 | 0.30 | 0.30 | 0.30 | 0.30 | 0.30 | 0.30 |
|  |  | mmol | 4.0 | 4.0 | 4.0 | 4.0 | 4.0 | 4.0 | 4.0 |
|  | Content | mass % | 22.5 | 22.5 | 22.3 | 21.9 | 21.5 | 22.5 | 22.9 |
| Compound (β) | FEC | g | — | — | — | — | — | 0.03 | — |
|  |  | mL | — | — | — | — | — | 0.03 | — |
|  |  | mmol | — | — | — | — | — | 0.4 | — |
|  | DMC | g | — | — | — | — | — | — | 0.07 |
|  |  | mL | — | — | — | — | — | — | 0.07 |
|  |  | mmol | — | — | — | — | — | — | 0.8 |
|  | Content | mass % | — | — | — | — | — | 2.0 | 4.8 |
| Other components | VC | g | 0.03 | 0.03 | 0.03 | 0.03 | 0.03 | — | 0.03 |
|  |  | mL | 0.03 | 0.03 | 0.03 | 0.03 | 0.03 | — | 0.03 |
|  |  | mmol | 0.4 | 0.4 | 0.4 | 0.4 | 0.4 | — | 0.4 |
|  | Content | mass % | 2.0 | 2.0 | 2.0 | 2.0 | 2.0 | — | 2.0 |
| $N_A/N_{Li}$ |  |  | 3.9 | 3.7 | 3.5 | 3.7 | 3.7 | 3.7 | 3.7 |
| $(N_A + N_B)/N_{Li}$ |  |  | 3.9 | 3.7 | 3.5 | 3.7 | 3.7 | 4.1 | 4.5 |
| Capacity retention rate when stored at high temperature | % |  | 77.5 | 85.4 | 83.2 | 88.5 | 86.6 | 79.6 | 80.8 |
| Gas generation amount when stored at high temperature | mL |  | 0.2 | 0.2 | 0.1 | 0.2 | 0.3 | 0.5 | 0.3 |

TABLE 2

|  |  |  | Ex. 8 | Ex. 9 | Ex. 10 | Ex. 11 | Ex. 12 | Ex. 13 | Ex. 14 |
|---|---|---|---|---|---|---|---|---|---|
| Non-aqueous electrolyte solution |  |  | 8 | 9 | 10 | 11 | 12 | 13 | 14 |
| Lithium salt | LPF | g | 0.15 | 0.15 | 0.15 | 0.15 | 0.15 | 0.15 | 0.18 |
|  |  | mmol | 1.0 | 1.0 | 1.0 | 1.0 | 1.0 | 1.0 | 1.2 |
|  |  | mass % | 10.0 | 10.2 | 10.4 | 10.1 | 11.7 | 9.8 | 11.9 |
|  | DPF | mg | 7.3 | 7.2 | 7.0 | 7.3 | 6.2 | 7.5 | 7.4 |
|  |  | mmol | 0.07 | 0.07 | 0.07 | 0.07 | 0.06 | 0.07 | 0.07 |
|  |  | mass % | 0.5 | 0.5 | 0.5 | 0.5 | 0.5 | 0.5 | 0.5 |
| Fluorine-containing solvent (α) | AE3000 | g | 0.82 | 0.71 | 0.61 | 0.82 | 0.61 | 0.82 | 0.74 |
|  |  | mL | 0.55 | 0.48 | 0.42 | 0.55 | 0.42 | 0.55 | 0.50 |
|  | MFA | g | — | — | — | — | — | 0.17 | — |
|  |  | mL | — | — | — | — | — | 0.14 | — |
|  | Content | mass % | 54.3 | 48.5 | 42.4 | 54.9 | 47.8 | 64.8 | 49.3 |
| Cyclic carboxylic acid ester compound | GBL | g | 0.35 | 0.35 | 0.35 | 0.34 | 0.35 | 0.35 | 0.41 |
|  |  | mL | 0.30 | 0.30 | 0.30 | 0.31 | 0.30 | 0.30 | 0.37 |
|  |  | mmol | 4.0 | 4.0 | 4.0 | 4.0 | 4.0 | 4.0 | 4.8 |
|  | Content | mass % | 23.3 | 23.8 | 24.2 | 23.2 | 27.4 | 22.9 | 27.4 |
| Compound (β) | DMC | g | 0.15 | 0.22 | 0.30 | — | — | — | 0.14 |
|  |  | mL | 0.14 | 0.21 | 0.28 | — | — | — | 0.13 |
|  |  | mmol | 1.7 | 2.5 | 3.3 | — | — | — | 1.5 |
|  | EMC | g | — | — | — | 0.14 | — | — | — |
|  |  | mL | — | — | — | 0.14 | — | — | — |
|  |  | mmol | — | — | — | 1.3 | — | — | — |
|  | DEC | g | — | — | — | — | 0.14 | — | — |
|  |  | mL | — | — | — | — | 0.14 | — | — |
|  |  | mmol | — | — | — | — | 1.1 | — | — |
|  | Content | mass % | 9.9 | 15.1 | 20.5 | 9.4 | 10.6 | — | 8.9 |
| Other components | VC | g | 0.03 | 0.03 | 0.03 | 0.03 | 0.03 | 0.03 | 0.03 |
|  |  | mL | 0.03 | 0.03 | 0.03 | 0.03 | 0.03 | 0.03 | 0.03 |
|  |  | mmol | 0.4 | 0.4 | 0.4 | 0.4 | 0.4 | 0.4 | 0.4 |
|  | Content | mass % | 2.0 | 2.0 | 2.0 | 2.0 | 2.0 | 2.0 | 2.0 |
| $N_A/N_{Li}$ |  |  | 3.7 | 3.8 | 3.8 | 3.7 | 3.8 | 3.7 | 3.8 |
| $(N_A + N_B)/N_{Li}$ |  |  | 5.3 | 6.1 | 6.8 | 5.0 | 4.9 | 3.7 | 5.0 |
| Capacity retention rate when stored at high temperature | % |  | 80.7 | 79.5 | 78.9 | 80.9 | 76.5 | 80.7 | 84.6 |
| Gas generation amount when stored at high temperature | mL |  | 0.5 | 0.5 | 0.6 | 0.4 | 0.4 | 0.1 | 0.6 |

TABLE 3

|  |  |  | Ex. 15 | Ex. 16 | Ex. 17 | Ex. 18 | Ex. 19 | Ex. 20 |
|---|---|---|---|---|---|---|---|---|
| Non-aqueous electrolyte solution |  |  | 15 | 16 | 17 | 18 | 19 | 20 |
| Lithium salt | LPF | g | 0.23 | 0.15 | 0.15 | 0.15 | 0.15 | 0.15 |
|  |  | mmol | 1.5 | 1.0 | 1.0 | 1.0 | 1.0 | 1.0 |
|  |  | mass % | 14.9 | 10.2 | 10.3 | 9.7 | 10.2 | 11.2 |
|  | DPF | mg | 7.5 | 7.2 | 7.1 | — | — | 6.5 |
|  |  | mmol | 0.07 | 0.07 | 0.07 | — | — | 0.06 |
|  |  | mass % | 0.5 | 0.5 | 0.5 | — | — | 0.5 |
| Fluorine-containing solvent (α) | AE3000 | g | 0.63 | 0.73 | 0.63 | 1.02 | 0.71 | — |
|  |  | mL | 0.43 | 0.49 | 0.43 | 0.69 | 0.48 | — |
|  |  | Content mass % | 41.4 | 49.2 | 43.7 | 65.8 | 48.7 | — |
| Cyclic carboxylic acid ester compound | GBL | g | 0.52 | 0.43 | 0.52 | 0.35 | 0.35 | — |
|  |  | mL | 0.46 | 0.38 | 0.46 | 0.30 | 0.30 | — |
|  |  | mmol | 6.0 | 5.0 | 6.0 | 4.0 | 4.0 | — |
|  |  | Content mass % | 33.7 | 29.2 | 35.6 | 22.6 | 23.9 | — |
| Compound (β) | EC | g | — | — | — | — | — | 0.66 |
|  |  | mL | — | — | — | — | — | 0.50 |
|  |  | mmol | — | — | — | — | — | 7.5 |
|  | DMC | g | 0.12 | 0.13 | 0.12 | — | 0.22 | — |
|  |  | mL | 0.11 | 0.12 | 0.11 | — | 0.21 | — |
|  |  | mmol | 1.3 | 1.5 | 1.3 | — | 2.5 | — |
|  | DEC | g | — | — | — | — | — | 0.49 |
|  |  | mL | — | — | — | — | — | 0.50 |
|  |  | mmol | — | — | — | — | — | 4.1 |
|  |  | Content mass % | 7.5 | 8.9 | 7.9 | — | 15.2 | 86.3 |
| Other components | VC | g | 0.03 | 0.03 | 0.03 | 0.03 | 0.03 | 0.03 |
|  |  | mL | 0.03 | 0.03 | 0.03 | 0.03 | 0.03 | 0.03 |
|  |  | mmol | 0.4 | 0.4 | 0.4 | 0.4 | 0.4 | 0.4 |
|  |  | Content mass % | 2.0 | 2.0 | 2.0 | 2.0 | 2.0 | 2.0 |
| $N_A/N_{Li}$ |  |  | 3.8 | 4.7 | 5.6 | 4.0 | 4.0 | — |
| $(N_A + N_B)/N_{Li}$ |  |  | 4.6 | 6.1 | 6.8 | 4.0 | 6.5 | 11.0 |
| Capacity retention rate when stored at high temperature | % |  | 85.2 | 81.5 | 83.2 | 70.1 | 65.3 | 55.1 |
| Gas generation amount when stored at high temperature | mL |  | 0.4 | 0.5 | 0.5 | 0.2 | 1.5 | 8.5 |

TABLE 4

|  |  | Ex. 2 | Ex. 4 | Ex. 8 | Ex. 13 | Ex. 15 | Ex. 17 | Ex. 20 |
|---|---|---|---|---|---|---|---|---|
| Negative electrode reactivity | Exothermic peak temperature | ◎ | ◎ | ◎ | ◎ | ◎ | ◎ | ○ |
|  | Heating value at 200° C. [μW] | 790 | 650 | 750 | 660 | 460 | 940 | 1530 |
| Positive electrode reactivity | Exothermic peak temperature | ◎ | ◎ | ◎ | ◎ | ◎ | ○ | x |
|  | Heating value at 200° C. [μW] | 260 | 320 | 570 | 450 | 680 | 1360 | 3510 |

As shown in Tables 1 to 3, in Ex. 1 to 17 in which a fluorine-containing solvent (α) and a cyclic carboxylic acid ester compound are contained and further difluorophosphate anions are contained, the capacity retention rate was high and the gas generation amount was small when stored at high temperature, and excellent high temperature storage properties were obtained, as compared with Ex. 18 and 19 in which difluorophosphate anions were not contained. In Ex. 1 to 17, the gas generation amount was remarkably reduced as compared with Ex. 20 in which a conventional carbonate electrolyte solution was used.

Further, as shown in Table 4, the non-aqueous electrolyte solution in each of Ex. 2, 4, 8, 13, 15 and 17 in which the liquid composition contained a fluorine-containing solvent (α) and a cyclic carboxylic acid ester compound, had low reactivity with the charging electrodes and was excellent in the thermal stability as compared with the non-aqueous electrolyte solution in Ex. 20. Particularly in Ex. 2, 4, 8, 13 and 15 in which the non-aqueous electrolyte solution wherein $(N_A+N_B)/N_{Li}$ was from 3.0 to 6.5 was used, the non-aqueous electrolyte solution had a very low reactivity with the charging electrodes and was remarkably excellent in the thermal stability.

INDUSTRIAL APPLICABILITY

The non-aqueous electrolyte solution of the present invention is useful as a non-aqueous electrolyte solution for lithium ion secondary batteries.

The lithium ion secondary battery of the present invention may be used in various applications to e.g. mobile phones, portable game devices, digital cameras, digital video cameras, electric tools, notebook computers, portable information terminals, portable music players, electric vehicles, hybrid cars, electric trains, aircrafts, satellites, submarines, ships, uninterruptible power supply systems, robots and electric power storage systems.

This application is a continuation of PCT Application No. PCT/JP2014/075139, filed on Sep. 22, 2014, which is based upon and claims the benefit of priority from Japanese Patent Application No. 2013-197592 filed on Sep. 24, 2013. The contents of those applications are incorporated herein by reference in their entireties.

What is claimed is:

1. A non-aqueous electrolyte solution, comprising: an electrolyte salt which comprises a lithium salt; and a liquid composition, the non-aqueous electrolyte solution comprising either one or both of monofluorophosphate anions and difluorophosphate anions derived from at least part of the electrolyte salt,
wherein the liquid composition comprises:
at least one fluorine-containing solvent (α) comprising a fluorine-containing ether compound, and optionally one selected from the group consisting of a fluorine-containing chain carboxylic acid ester compound and a fluorine-containing chain carbonate compound, in an amount of from 54.3 to 80 mass % with respect to 100 mass % of the non-aqueous electrolyte solution;
at least one compound (β) selected from the group consisting of a saturated cyclic carbonate compound, a saturated chain carbonate compound having no fluorine atom, a saturated cyclic sulfone compound, which is not a lithium salt, and a phosphoric acid ester compound, in an amount of from 0.01 mass % to 30 mass % with respect to 100 mass % of the non-aqueous electrolyte solution; and
a cyclic carboxylic acid ester compound which comprises at least one selected from the group consisting of γ-butyrolactone, γ-valerolactone and ε-caprolactone,
wherein the fluorine-containing ether compound comprises $CF_3CH_2OCF_2CHF_2$, $CF_3CH_2OCF_2CHFCF_3$, $CHF_2CF_2CH_2OCF_2CHF_2$, $CH_3CH_2CH_2OCF_2CHF_2$, $CH_3CH_2OCF_2CHF_2$, $CHF_2CF_2CH_2OCF_2CHFCF_3$, or a mixture thereof, and
wherein the ratio of the mass of the fluorine-containing ether compound to the total mass of the at least one fluorine-containing solvent (a) is from 70 to 100 mass %.

2. The non-aqueous electrolyte solution according to claim 1, wherein the ratio of the sum of the mass of the monofluorophosphate anions and the mass of the difluorophosphate anions to the total mass of the non-aqueous electrolyte solution is from 0.001 to 2 mass %.

3. The non-aqueous electrolyte solution according to claim 1, wherein the ratio of the mass of the saturated chain carbonate compound having no fluorine atom to the total mass of the non-aqueous electrolyte solution is at most 30 mass %.

4. The non-aqueous electrolyte solution according to claim 1, wherein the ratio of the sum of the mass of the saturated cyclic carbonate compound and the mass of the saturated chain carbonate compound having no fluorine atom to the total mass of the non-aqueous electrolyte solution is at most 30 mass %.

5. The non-aqueous electrolyte solution according to claim 1, wherein $(N_A+N_B)/N_{Li}$, which is the ratio of the sum of the total number of moles ($N_A$) of the cyclic carboxylic acid ester compound and the total number of moles ($N_B$) of the at least one compound (β) to the total number of moles ($N_{Li}$) of lithium atoms derived from the lithium salt, is from 3.0 to 7.0.

6. The non-aqueous electrolyte solution according to claim 1, wherein the lithium salt comprises $LiPF_6$.

7. The non-aqueous electrolyte solution according to claim 1, wherein the fluorine-containing solvent (α) comprises the fluorine-containing chain carboxylic acid ester compound, and the fluorine-containing chain carboxylic acid ester compound is a compound represented by formula (2):

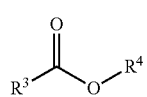

(2)

wherein each of $R^3$ and $R^4$ is independently a $C_{1-3}$ alkyl group or a $C_{1-3}$ fluorinated alkyl group, provided that at least one of $R^3$ and $R^4$ is a fluorinated alkyl group.

8. The non-aqueous electrolyte solution according to claim 1, wherein $N_A/N_{Li}$, which is the ratio of the total number of moles ($N_A$) of the cyclic carboxylic acid ester compound to the total number of moles ($N_{Li}$) of lithium atoms derived from the lithium salt, is from 1.5 to 7.0.

9. The non-aqueous electrolyte solution according to claim 1, wherein a lithium salt content of the non-aqueous electrolyte solution is from 0.7 to 1.5 mol/L.

10. The non-aqueous electrolyte solution according to claim 1, wherein the ratio of the mass of the cyclic carboxylic acid ester compound to the total mass of the non-aqueous electrolyte solution is from 4 to 50 mass %.

11. A lithium ion secondary battery comprising:
a positive electrode which comprises, as an active material, a material capable of absorbing and desorbing lithium ions;
a negative electrode which comprises, as an active material, at least one selected from the group consisting of metal lithium, a lithium alloy and a carbon material capable of absorbing and desorbing lithium ions; and
the non-aqueous electrolyte solution as defined in claim 1.

12. The non-aqueous electrolyte solution according to claim 1, wherein the amount of the at least one fluorine-containing solvent (a) is from 60 to 80 mass % with respect to 100 mass % of the non-aqueous electrolyte solution.

13. The non-aqueous electrolyte solution according to claim 1, wherein an amount of the saturated cyclic carbonate compound is at most 10 mass % with respect to the non-aqueous electrolyte solution.

14. The non-aqueous electrolyte solution according to claim 1, wherein an amount of the saturated cyclic carbonate compound is at most 5 mass % with respect to the non-aqueous electrolyte solution.

15. The non-aqueous electrolyte solution according to claim 1, wherein the non-aqueous electrolyte solution does not comprise the saturated cyclic carbonate compound.

16. The non-aqueous electrolyte solution according to claim 1, wherein the non-aqueous electrolyte solution comprises the monofluorophosphate anions, and the monofluorophosphate anions are derived from $Li_2PO_3F$.

17. The non-aqueous electrolyte solution according to claim 1, wherein the non-aqueous electrolyte solution comprises the difluorophosphate anions, and the difluorophosphate anions are derived from $LiPO_2F_2$.

18. The non-aqueous electrolyte solution according to claim 1, wherein $(N_A+N_B)/N_{Li}$, which is the ratio of the sum of the total number of moles ($N_A$) of the cyclic carboxylic acid ester compound and the total number of moles ($N_B$) of the at least one compound (β) to the total number of moles ($N_{Li}$) of lithium atoms derived from the lithium salt, is from 3.5 to 4.5.

19. The non-aqueous electrolyte solution according to claim 1, wherein $N_A/N_{Li}$, which is the ratio of the total number of moles ($N_A$) of the cyclic carboxylic acid ester compound to the total number of moles ($N_{Li}$) of lithium atoms derived from the lithium salt, is from 3 to 4.2.

20. The non-aqueous electrolyte solution according to claim 1, wherein the amount of the at least one compound (β) is from 0.1 to 20 mass % with respect to 100 mass % of the non-aqueous electrolyte solution.

* * * * *